United States Patent
Dunn et al.

(10) Patent No.: US 11,962,608 B2
(45) Date of Patent: *Apr. 16, 2024

(54) CYBER THREAT DEFENSE SYSTEM PROTECTING EMAIL NETWORKS WITH MACHINE LEARNING MODELS USING A RANGE OF METADATA FROM OBSERVED EMAIL COMMUNICATIONS

(71) Applicant: Darktrace Holdings Limited, Cambridge (GB)

(72) Inventors: Matthew Dunn, Cambridgeshire (GB); Matthew Ferguson, Huntingdon (GB); Stephen Pickman, Huntingdon (GB)

(73) Assignee: Darktrace Holdings Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,708

(22) Filed: Oct. 14, 2022

(65) Prior Publication Data

US 2023/0044354 A1 Feb. 9, 2023

Related U.S. Application Data

(63) Continuation of application No. 16/732,644, filed on Jan. 2, 2020, now Pat. No. 11,477,222, which is a
(Continued)

(51) Int. Cl.
*H04L 9/40* (2022.01)
*G06N 20/00* (2019.01)
*H04L 101/37* (2022.01)

(52) U.S. Cl.
CPC ......... *H04L 63/1425* (2013.01); *G06N 20/00* (2019.01); *H04L 63/1416* (2013.01); *H04L 2101/37* (2022.05)

(58) Field of Classification Search
None
See application file for complete search history.

(56) References Cited

U.S. PATENT DOCUMENTS 8,903,920 B1 12/2014 Hodgson
8,996,485 B1 * 3/2015 Krishnamurthy ....... G06F 21/50
707/705
(Continued)

OTHER PUBLICATIONS

Saar Cohen et al., "Spectral Bloom Filters," 2003, pp. 1-12, as printed.
(Continued)

*Primary Examiner* — Michael W Chao
(74) *Attorney, Agent, or Firm* — Rutan and Tucker, LLP

(57) ABSTRACT

A cyber-threat defense system for a network including its email domain protects this network from cyber threats. Modules utilize machine learning models as well communicate with a cyber threat module. Modules analyze the wide range of metadata from the observed email communications. The cyber threat module analyzes with the machine learning models trained on a normal behavior of email activity and user activity associated with the network and in its email domain in order to determine when a deviation from the normal behavior of email activity and user activity is occurring. A mass email association detector determines a similarity between highly similar emails being i) sent from or ii) received by a collection of two or more individual users in the email domain in a substantially simultaneous time frame. Mathematical models can be used to determine similarity weighing in order to derive a similarity score between compared emails.

30 Claims, 16 Drawing Sheets

Related U.S. Application Data continuation-in-part of application No. 16/278,932, filed on Feb. 19, 2019, now Pat. No. 11,606,373.

(60) Provisional application No. 62/796,507, filed on Jan. 24, 2019, provisional application No. 62/632,623, filed on Feb. 20, 2018.

(56) References Cited

U.S. PATENT DOCUMENTS

| | | | |
|---|---|---|---|
| 9,773,112 | B1 | 9/2017 | Rathor et al. |
| 11,757,914 | B1* | 9/2023 | Jakobsson .......... H04L 63/1483 726/25 |
| 11,765,121 | B2* | 9/2023 | O'Brien ................ G06N 7/01 709/206 |
| 2006/0123464 | A1* | 6/2006 | Goodman .......... H04L 63/1466 726/2 |
| 2007/0107059 | A1 | 5/2007 | Chasin et al. |
| 2010/0287246 | A1 | 11/2010 | Klos et al. |
| 2015/0319185 | A1 | 11/2015 | Kirti et al. |
| 2015/0381646 | A1* | 12/2015 | Lin .................... H04L 63/1425 726/23 |
| 2016/0065599 | A1* | 3/2016 | Hovor .................... H04L 67/10 726/23 |
| 2017/0048261 | A1 | 2/2017 | Gmach et al. |
| 2017/0230391 | A1 | 8/2017 | Ferguson et al. |
| 2017/0244736 | A1 | 8/2017 | Benishti et al. |
| 2017/0359362 | A1* | 12/2017 | Kashi .................. H04L 51/212 |
| 2018/0081991 | A1* | 3/2018 | Barber ................ H04L 63/1441 |
| 2018/0121566 | A1 | 5/2018 | Filippi et al. |
| 2018/0295146 | A1 | 10/2018 | Kovega et al. |
| 2019/0028510 | A1 | 1/2019 | Celik |
| 2019/0238571 | A1 | 8/2019 | Adir et al. |
| 2019/0251252 | A1* | 8/2019 | Prakash .................. G06F 21/51 |
| 2021/0021612 | A1* | 1/2021 | Higbee ............... H04L 63/1491 |
| 2022/0053013 | A1* | 2/2022 | Crabtree ................ H04L 63/20 |
| 2023/0344841 | A1* | 10/2023 | Tambuluri ............... G06N 7/01 |

OTHER PUBLICATIONS

Shih Dh et al., "Classification methods in the detection of new malicious emails", Information Sciences, Jun. 9, 2005, pp. 241-261, vol. 172, No. 1-2, Amsterdam, NL.

Non-Final Office Action for U.S. Appl. No. 16/732,644 dated Feb. 15, 2022, 42 pages.

Extended European Search Report for Application No. EP19158046. 3, dated Jul. 11, 2019, 9 pages.

Final Office Action for U.S. Appl. No. 16/278,932 dated Jun. 23, 2022, 26 pages.

Non-Final Office Action for U.S. Appl. No. 16/278,932 dated Dec. 8, 2021, 37 pages.

* cited by examiner

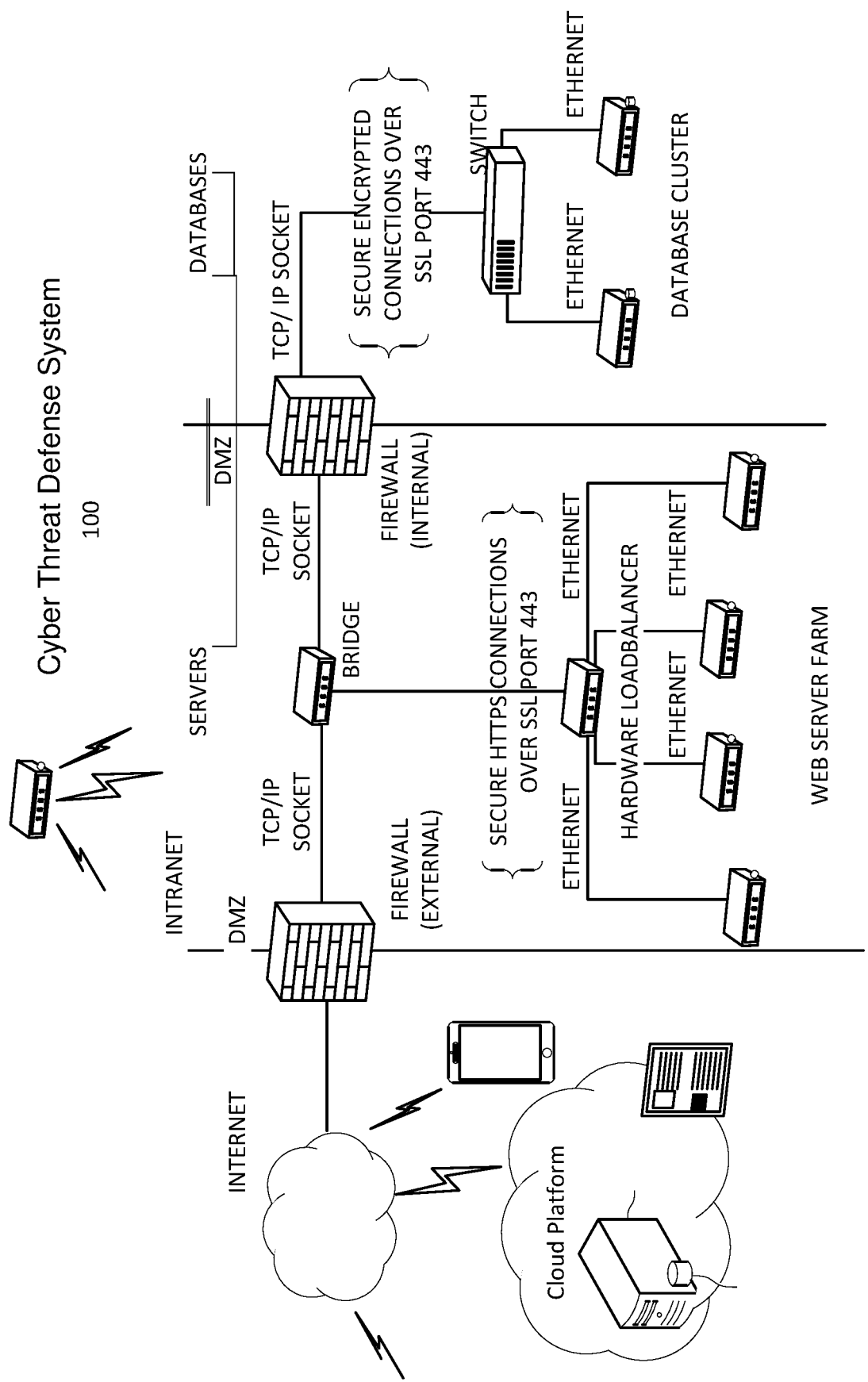
FIG. 2 network

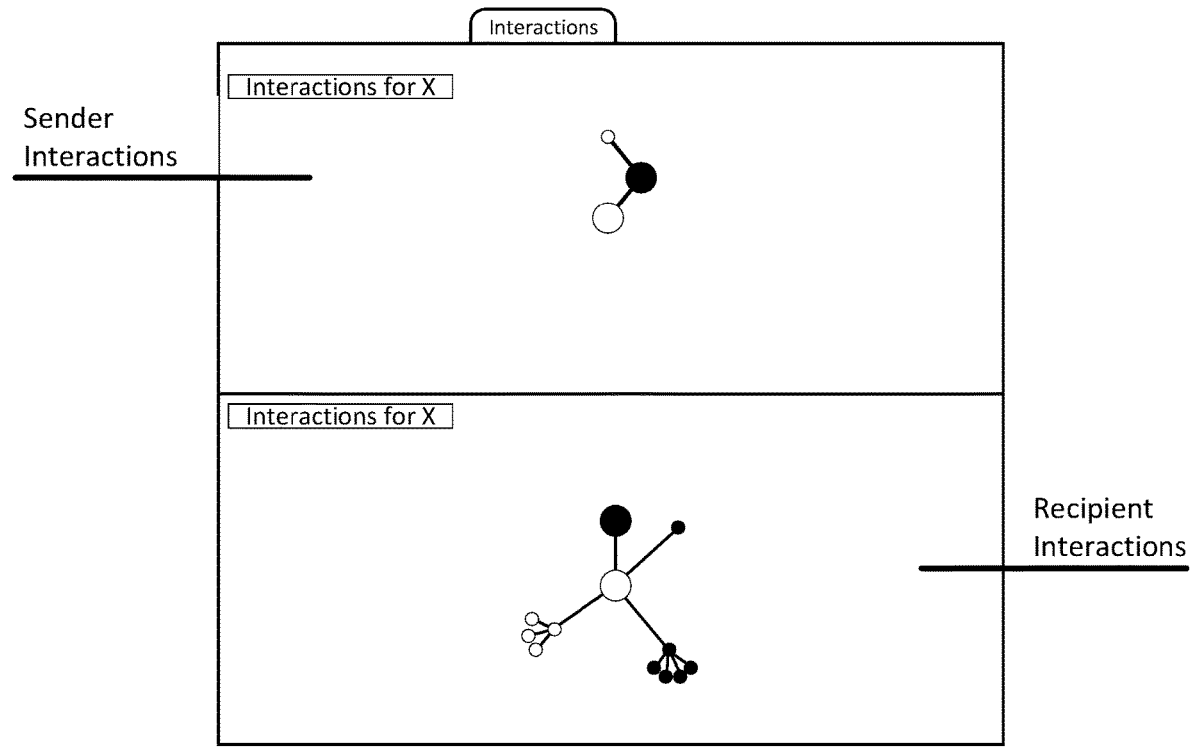
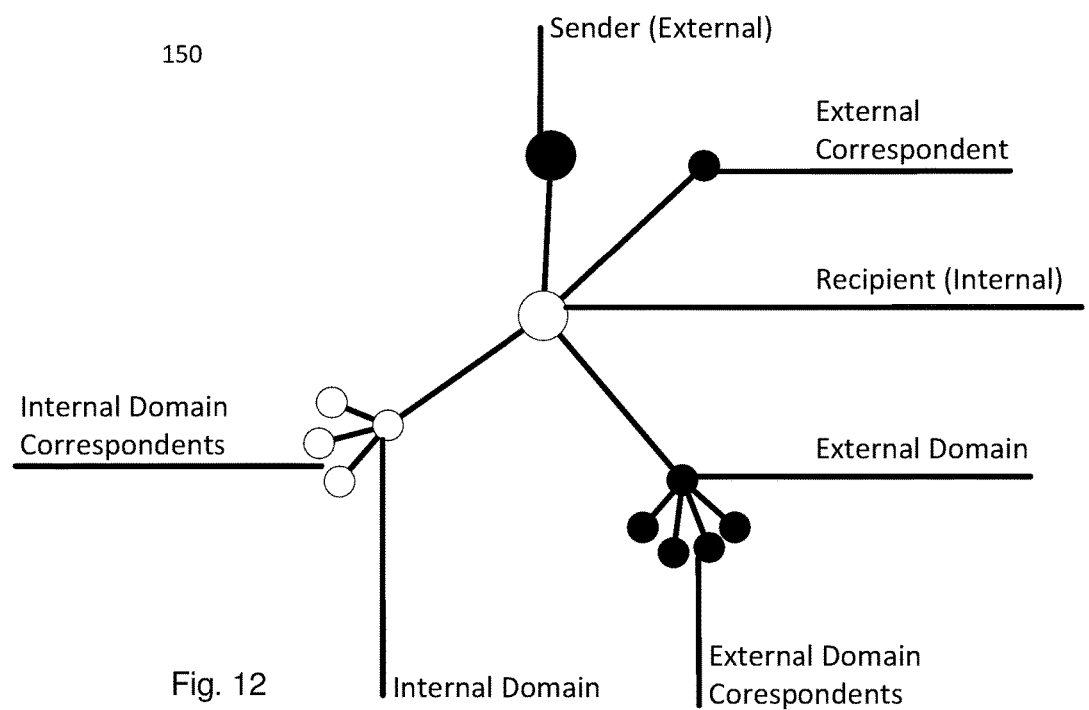
Fig. 12

2

CYBER THREAT DEFENSE SYSTEM PROTECTING EMAIL NETWORKS WITH MACHINE LEARNING MODELS USING A RANGE OF METADATA FROM OBSERVED EMAIL COMMUNICATIONS

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATIONS

This application claims the benefit of priority under 35 USC 120 from U.S. patent application Ser. No. 16/732,644 titled "A cyber threat defense system protecting email networks with machine learning models using a range of metadata from observed email communications," filed 2 Jan. 2020, which claimed priority to and the benefit of 35 USC 119 of U.S. provisional patent application titled "A Cyber Security System," filed Jan. 24, 2019, Ser. No. 62/796,507 as well as This application also claims claimed priority to and the benefit of under 35 USC 121 of U.S. patent application titled "A cyber threat defense system protecting email networks with machine learning models" filed Feb. 19, 2019, Ser. No. 16/278,932, which claims priority to provisional patent application titled "A cyber threat defense system with various improvements," filed Feb. 20, 2018, Ser. No. 62/632,623, all of which are incorporated herein by reference in their entirety.

FIELD

Embodiments of the design provided herein generally relate to a cyber-threat defense system. In an embodiment, Artificial Intelligence analyzes Cyber Security threats coming from and/or associated with an email.

BACKGROUND

In the cyber security environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat where intelligent threats modify their behavior and actively seek to avoid detection. Cyber threat including email threats can be subtle and rapidly cause harm to a network. Having an automated response can allow a system to rapidly counter these threats.

SUMMARY

In an embodiment, a cyber-threat defense system protects a system from cyber threats coming from and/or associated with an email and/or an email system. One or more machine learning models are trained on a normal behavior of email activity and user activity associated with an email system and the normal behavior of a user of the email domain as perceived from their normal network behavior. The normal network behavior can be derived from other systems, which operate outside of email interaction. A cyber-threat module can have one or more machine learning models trained on cyber threats in the email system. The cyber-threat module may reference the machine learning models that are trained on the normal behavior of email activity and user activity associated with the email system. The cyber-threat module determines a threat risk parameter that factors in the likelihood that a chain of one or more unusual behaviors of the email activity and user activity under analysis fall outside of derived normal benign behavior. Probes collect the user activity and the email activity and then feed that activity to the cyber-threat module to draw an understanding of the email activity and user activity in the email system. An autonomous response module, rather than a human taking an action, is configured to cause one or more autonomous actions to be taken to contain the cyber-threat when the threat risk parameter from the cyber-threat module is equal to or above an actionable threshold.

In an embodiment, the cyber threat defense system for a network including its email domain protects this network from cyber threats. Two or more modules utilize a set of machine learning models as well as communicate with a cyber threat module. The two or more modules also are configured to receive information from a set of detectors to provide at least a wide range of metadata from observed email communications in the email domain. The cyber threat module cooperates with the two or more modules to analyze the wide range of metadata from the observed email communications. The cyber threat module analyzes with the machine learning models trained on a normal behavior of email activity and user activity associated with the network and in its email domain in order to determine when a deviation from the normal behavior of email activity and user activity is occurring. A mass email association detector determines a similarity between two or more highly similar emails (or other forms of communication) being i) sent from or ii) received by a collection of two or more individual users in the email domain in a substantially simultaneous time frame or in the same communication. One or more mathematical models can be used to determine similarity weighing in order to derive a similarity score between compared emails.

These and other features of the design provided herein can be better understood with reference to the drawings, description, and claims, all of which form the disclosure of this patent application.

DRAWINGS

The drawings refer to some embodiments of the design provided herein in which:

FIG. 1A illustrates a block diagram of an embodiment of a cyber-threat defense system with a cyber-threat module that references machine learning models that are trained on the normal behavior of email activity and user activity associated with at least the email system, where the cyber-threat module determines a threat risk parameter that factors in 'the likelihood that a chain of one or more unusual behaviors of the email activity and user activity under analysis fall outside of derived normal benign behavior;' and thus, are likely malicious behavior.

FIG. 2 illustrates a block diagram of an embodiment of the cyber-threat defense system with probes and detectors monitoring email activity and network activity to feed this data to correlate causal links between these activities to supply this input into the cyber-threat analysis.

Figure 3:
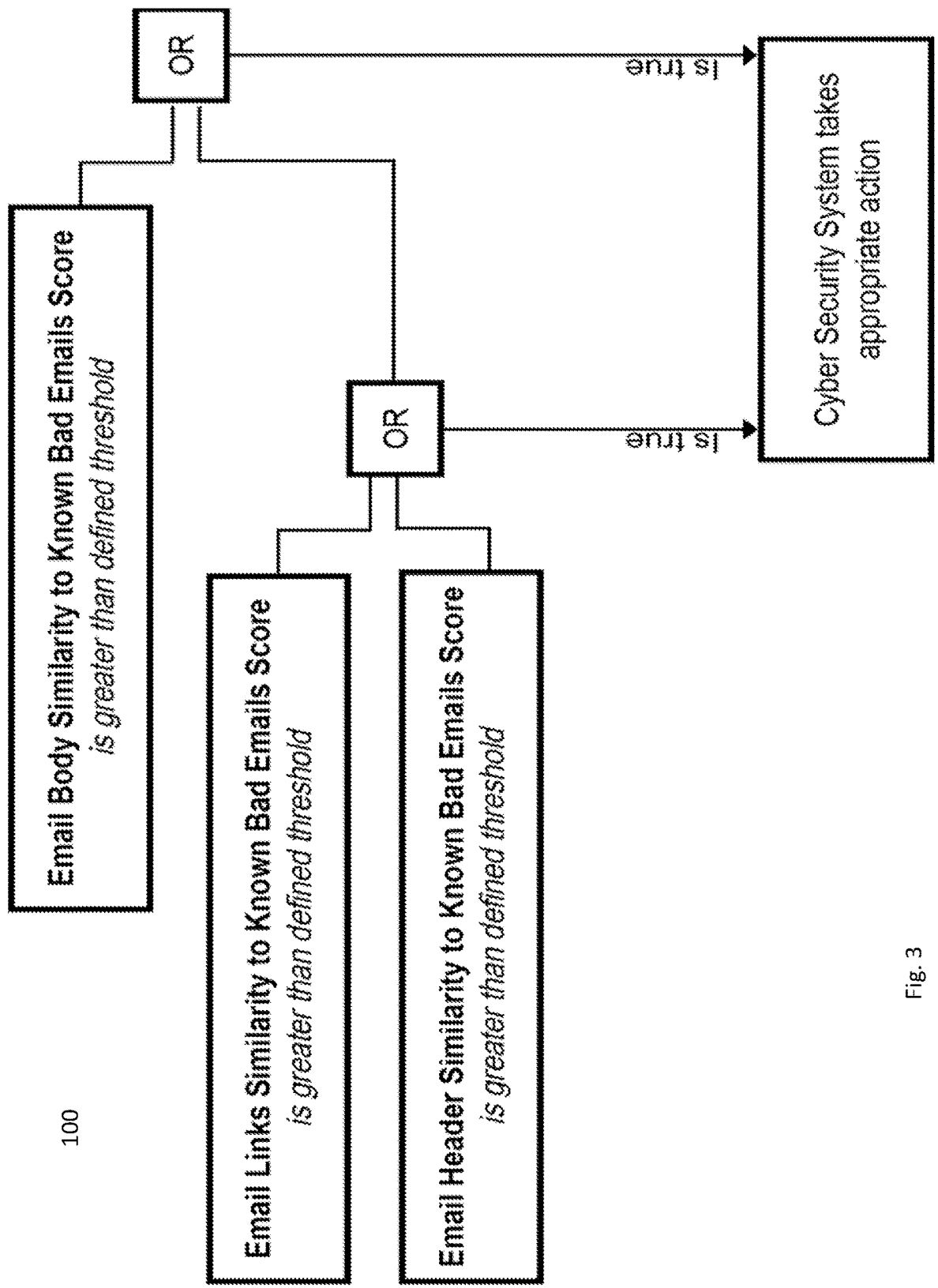

FIG. 3 illustrates a block diagram of an embodiment of an email similarity scoring module configured to cooperate with the one or more mathematical models in order to compare an incoming email, based on a semantic similarity of multiple aspects of the email to a cluster of different metrics derived from known bad emails to derive a similarity score between an email under analysis and the cluster of different metrics derived from known bad emails.

Figure 4:
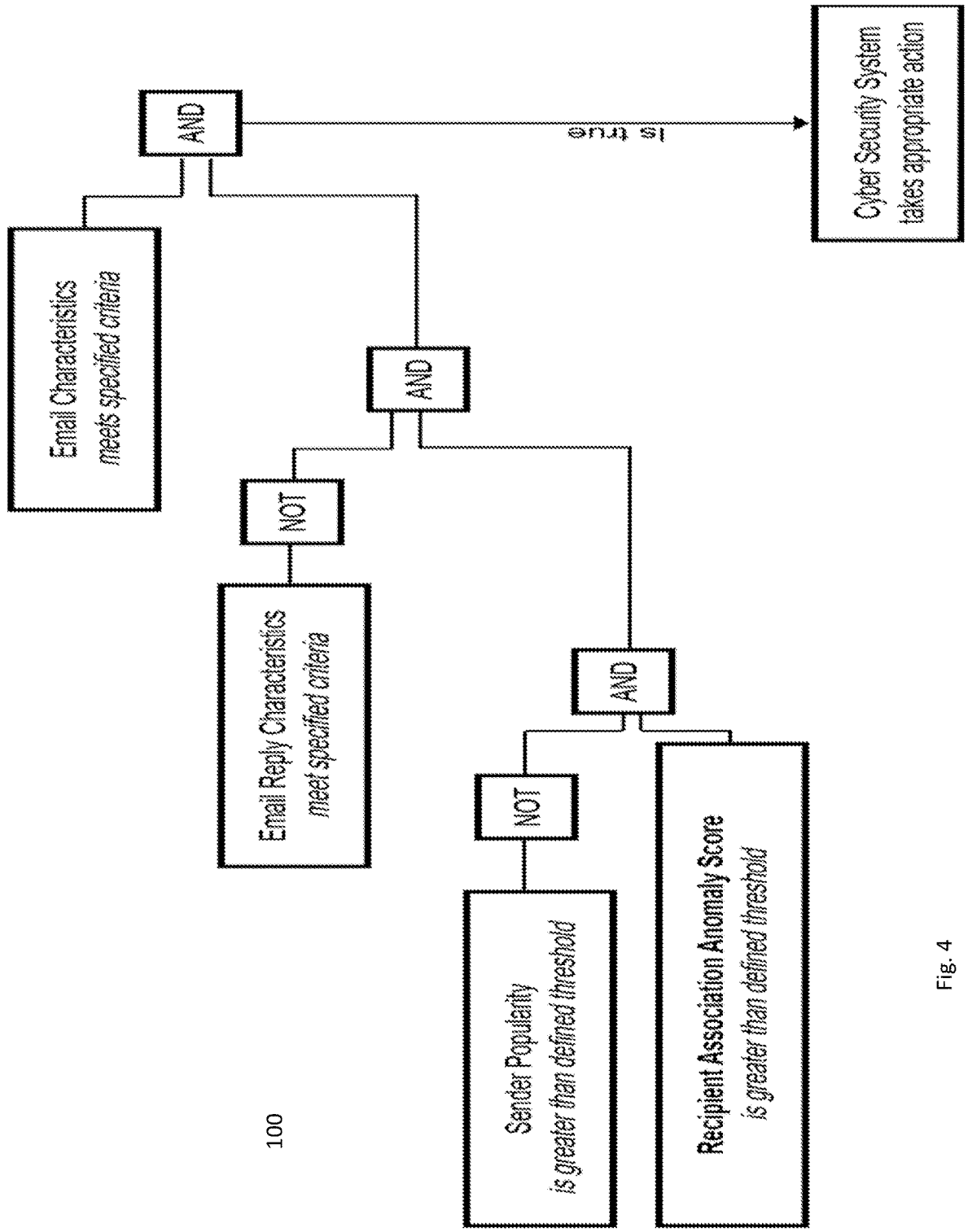

FIG. 4 illustrates a block diagram of an embodiment of a mass email association detector configured to determine a similarity between two or more highly similar emails being i) sent from or ii) received by a collection of two or more individual users in the email domain in a substantially simultaneous time frame, where one or more mathematical models are used to determine similarity weighing in order to derive a similarity score between compared emails.

Figure 5:
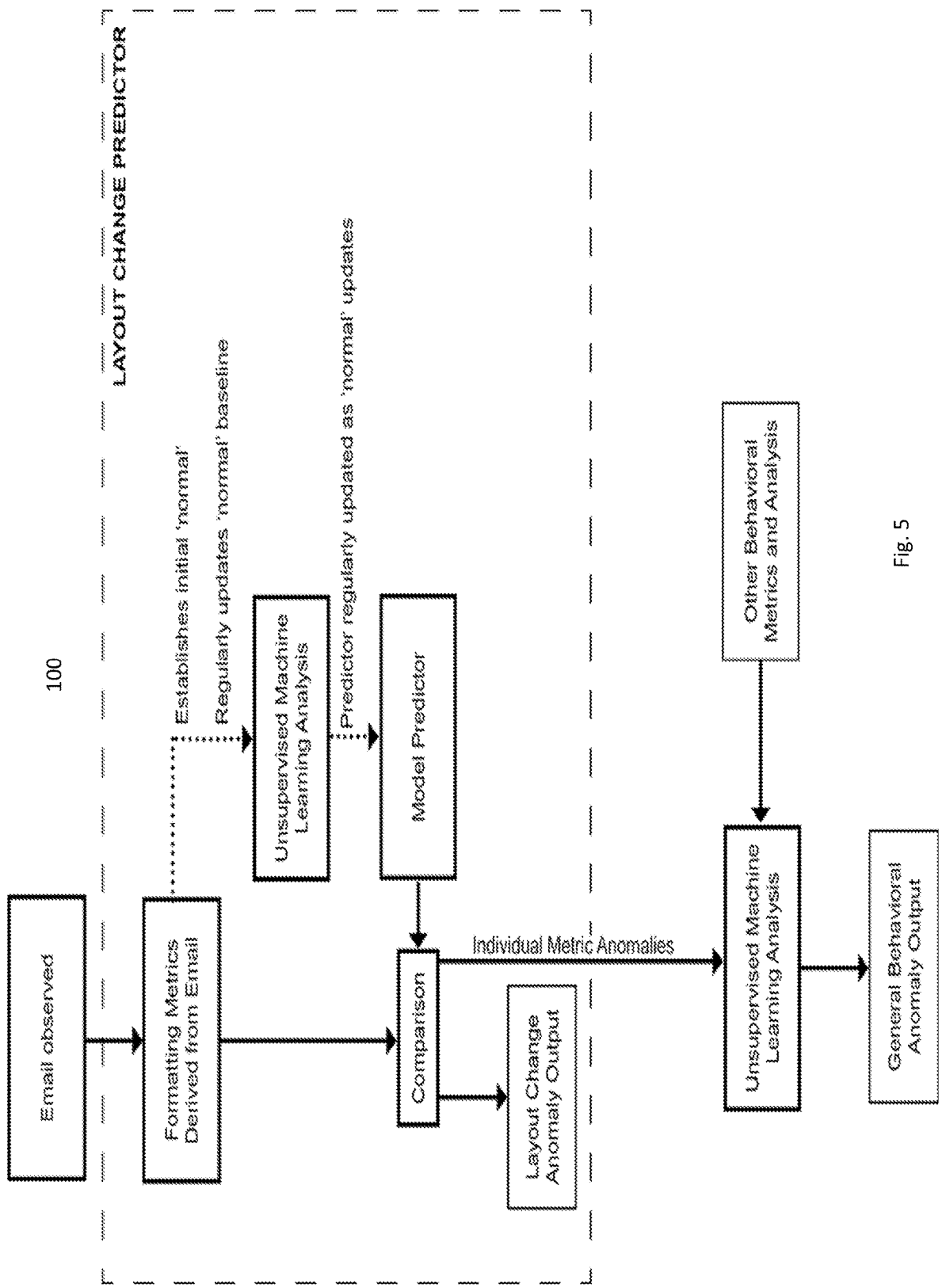

FIG. 5 illustrates a block diagram of an embodiment of an email layout change predictor module configured to analyze changes in an email layout of an email of a user in that email domain to assess whether malicious activity is occurring to an email account of that user, based on the changes in the email layout of the email deviating from a historical norm.

Figure 6:
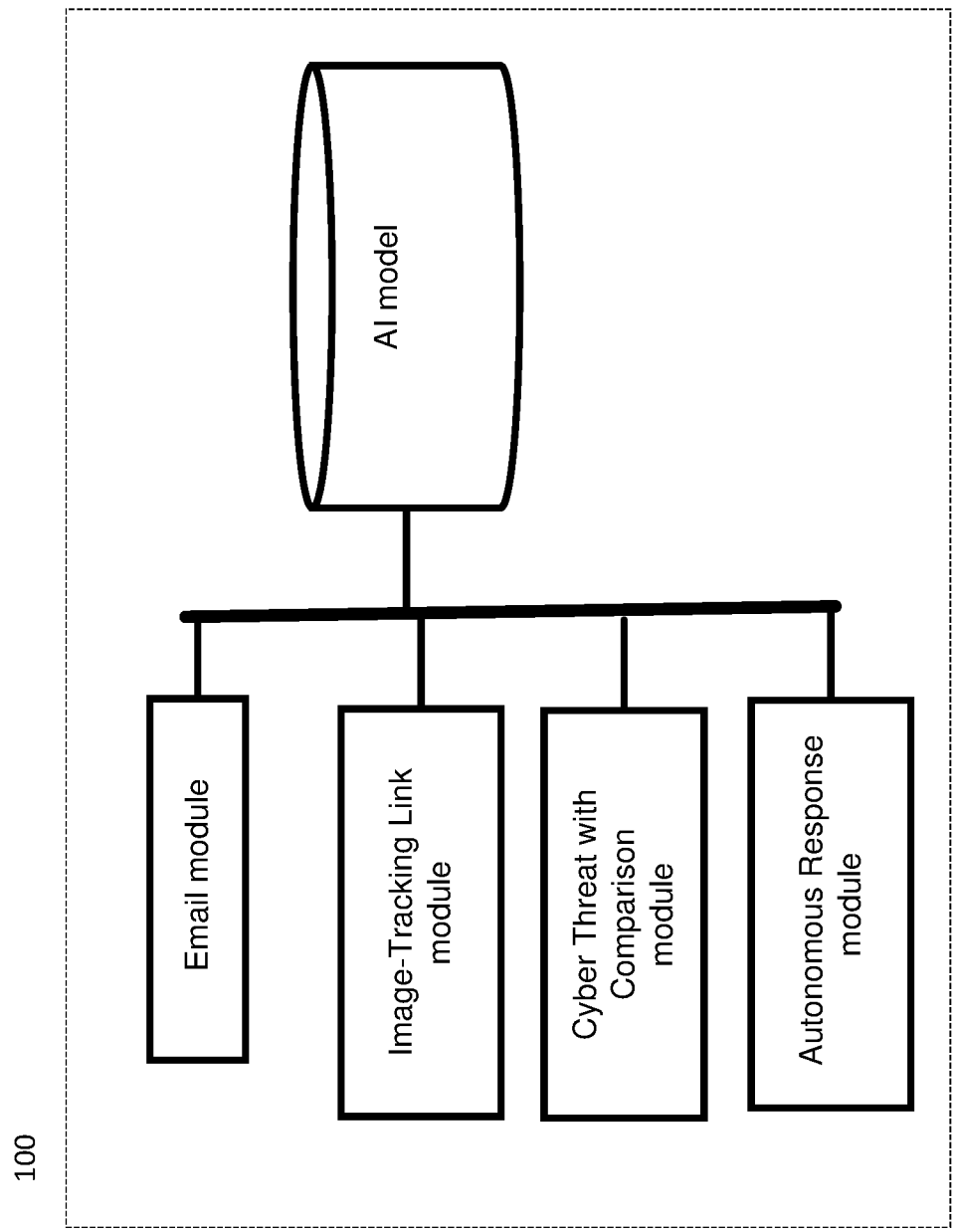

FIG. 6 illustrates a block diagram of an embodiment of an image-tracking link detector that detects image-tracking links based on visual properties of the link as well as a purpose of any query parameters from that link.

Figure 7:
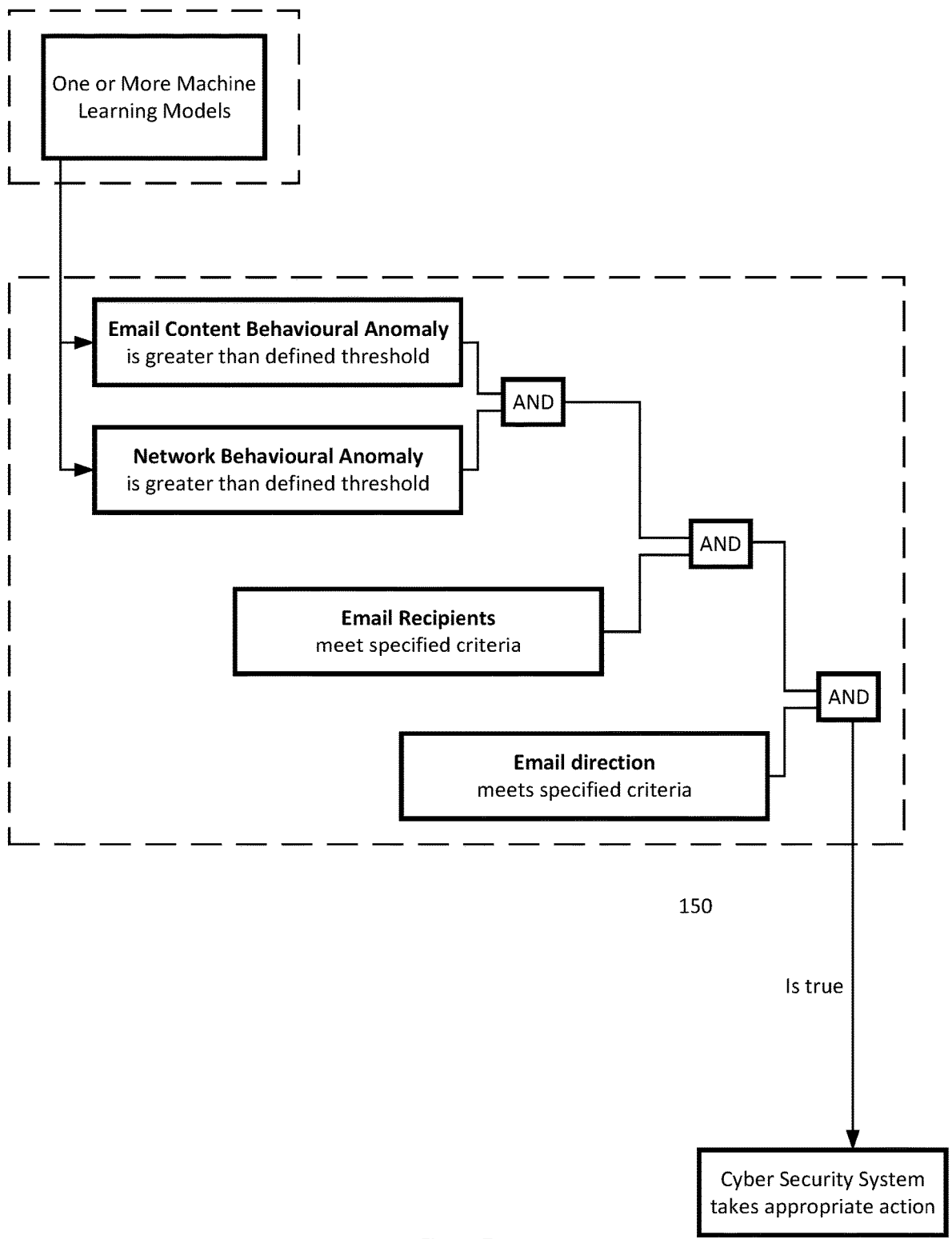

FIG. 7 illustrates a block diagram of an embodiment of the cyber-threat module determining a threat risk parameter that factors in how the chain of unusual behaviors correlate to potential cyber threats and 'the likelihood that this chain of one or more unusual behaviors of the email activity and user activity under analysis fall outside of derived normal benign behavior;' and thus, is malicious behavior.

Figure 8:
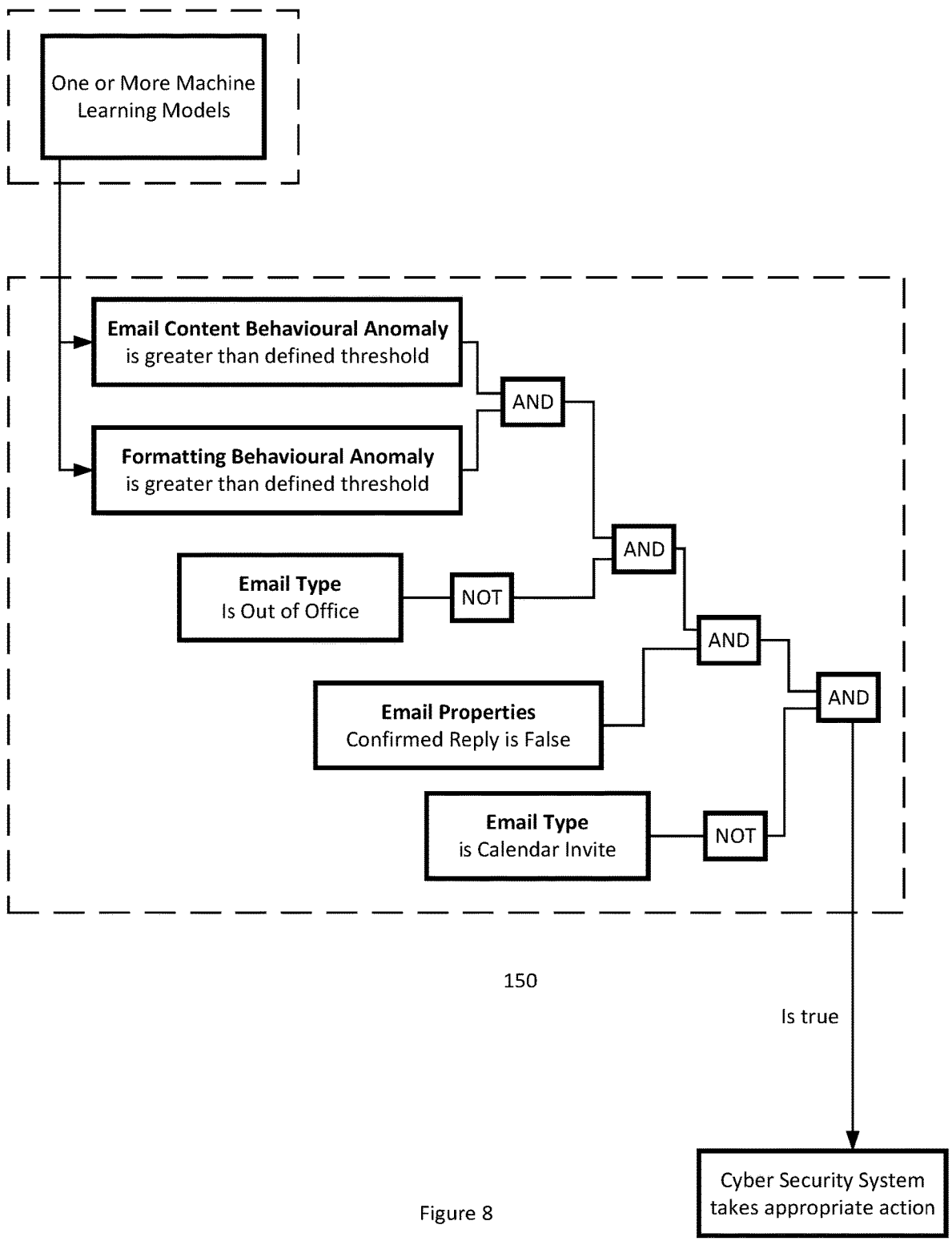

FIG. 8 illustrates a block diagram of an embodiment of the cyber-threat defense system referencing one or more machine learning models trained on gaining an understanding of a plurality of characteristics on an email itself and its related data including classifying the properties of the email and its metadata.

Figure 9:
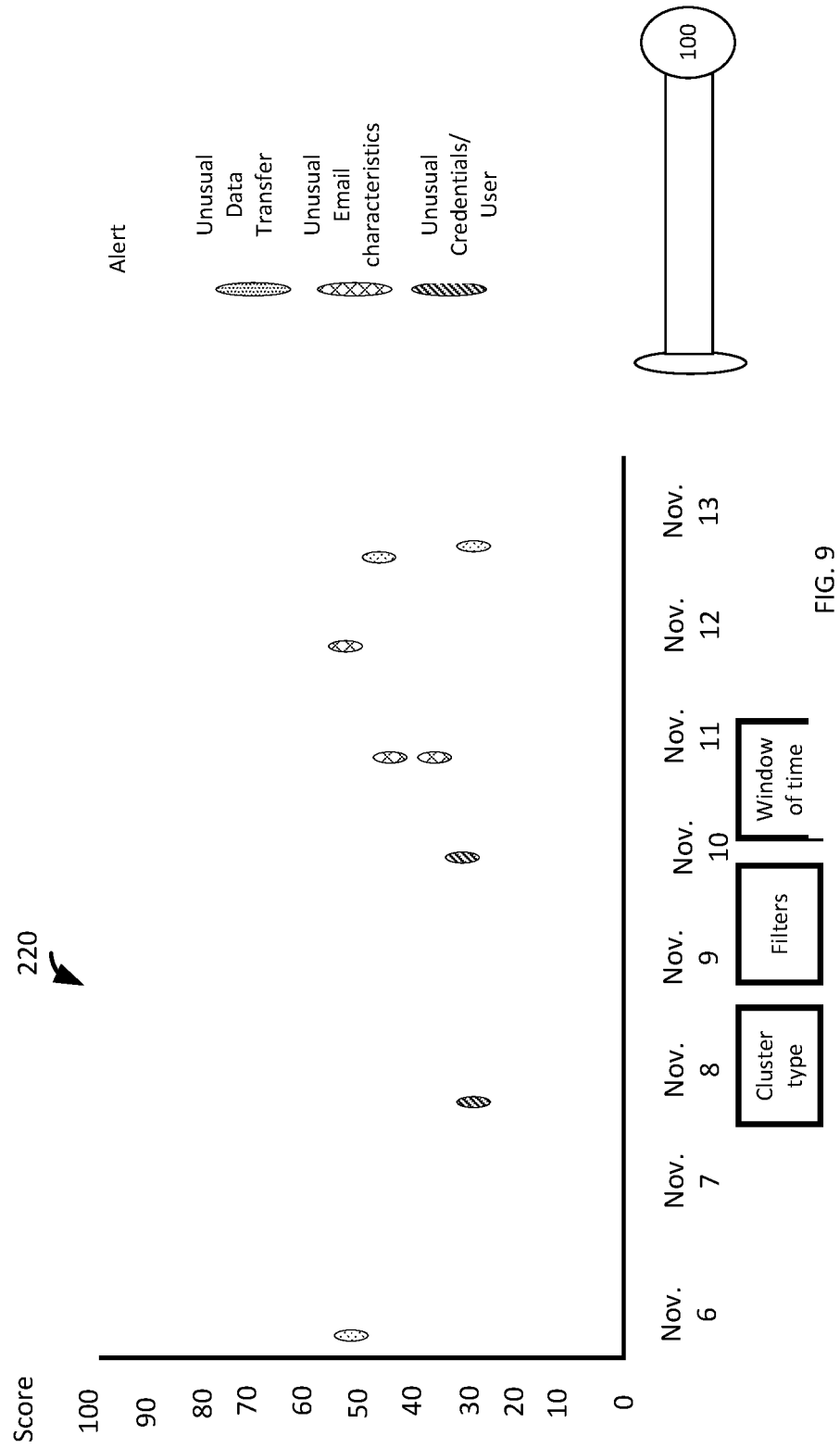

FIG. 9 illustrates a block diagram of an embodiment of an example chain of unusual behavior for the email(s) in connection with the rest of the network under analysis.

Figure 10:
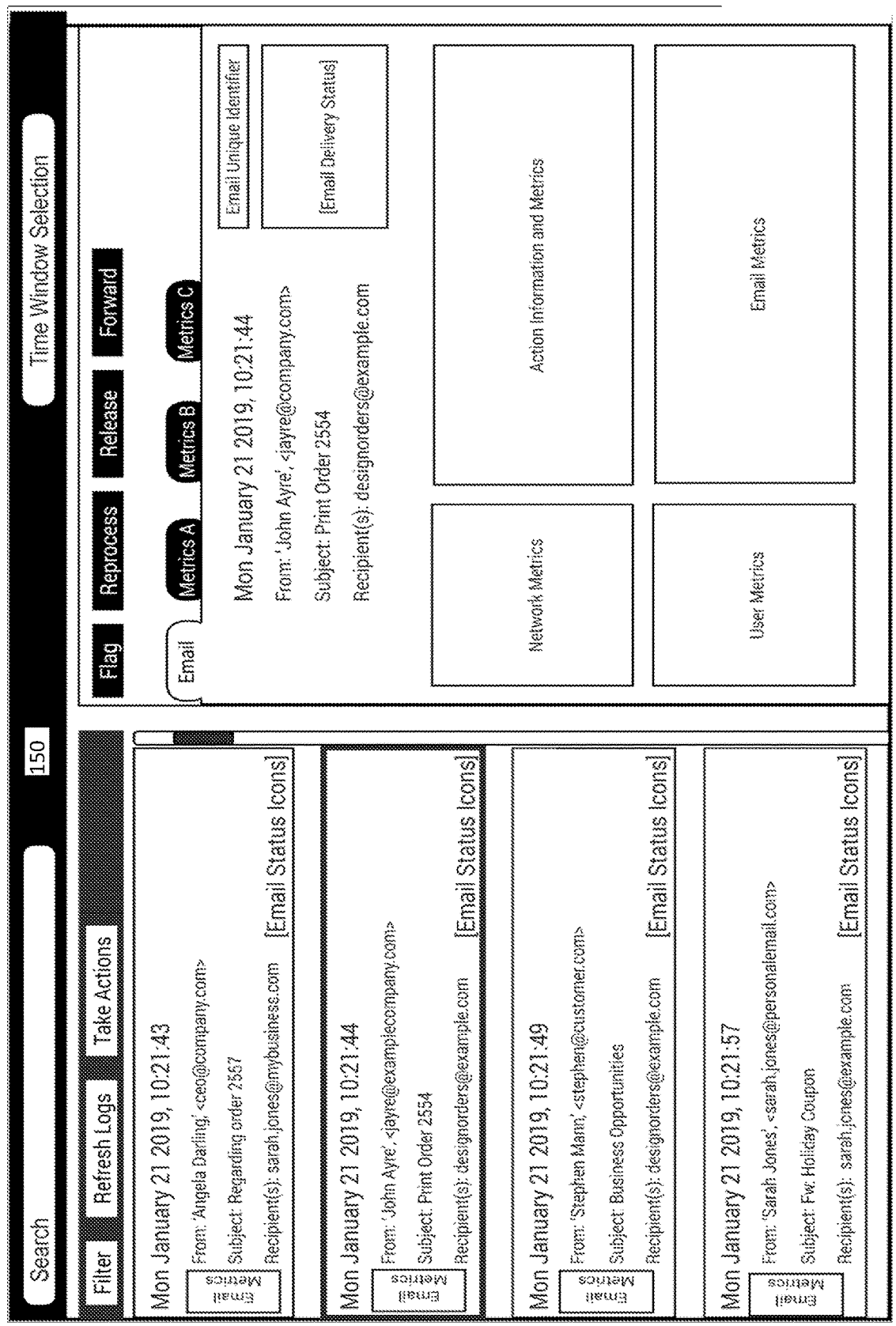

FIG. 10 illustrates a block diagram of an embodiment of an example window of the user interface with an inbox-style view of all emails coming in/out of an email domain and the cyber security characteristics known about one or more e-mails under analysis.

Figure 11:
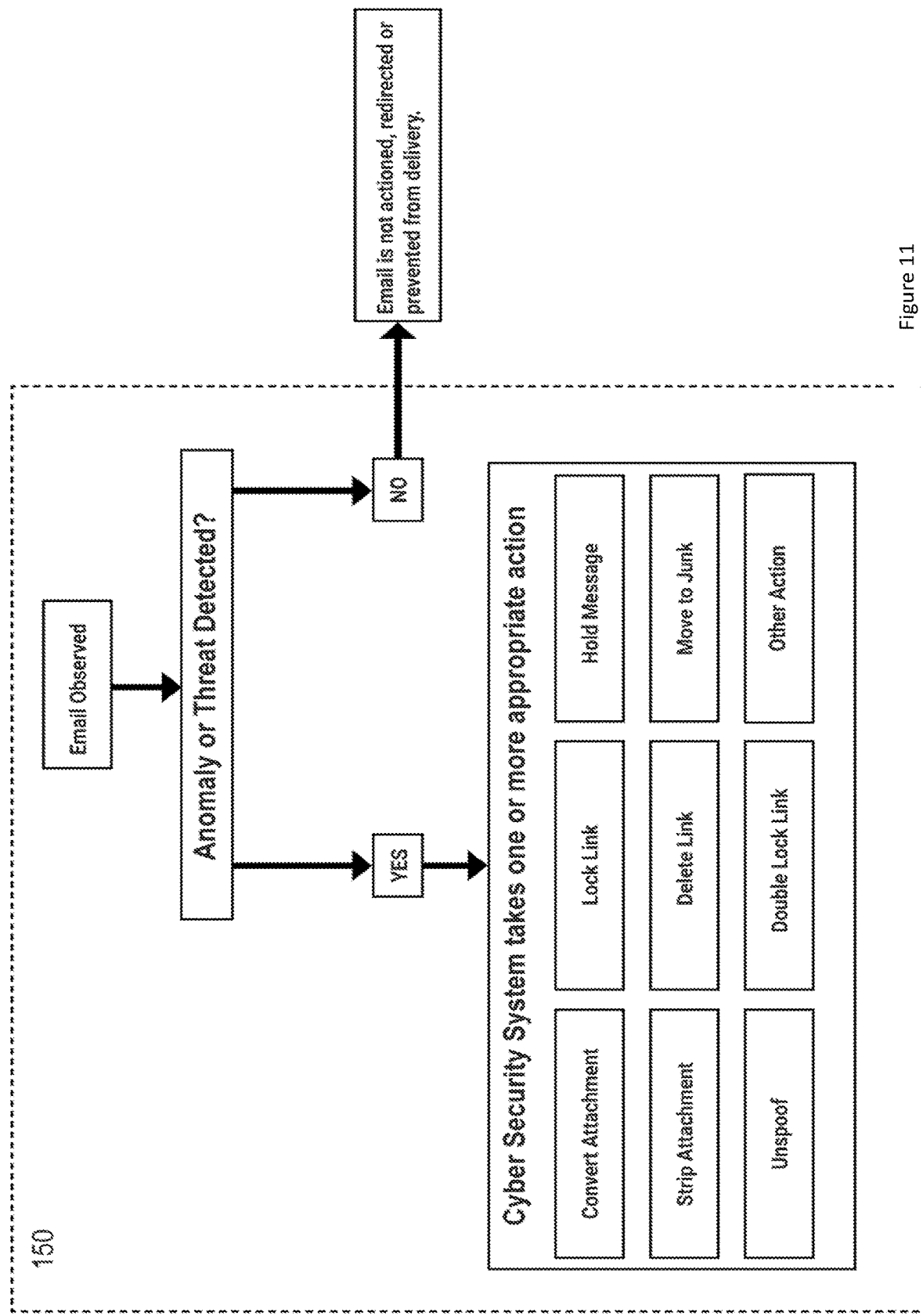

FIG. 11 illustrates a block diagram of an embodiment of example autonomous actions that the autonomous rapid response module can be configured to take without a human initiating that action.

FIG. 12 illustrates a block diagram of an embodiment of email module and network module cooperating to supply a particular user's network activity tied to their email activity.

Figure 13:
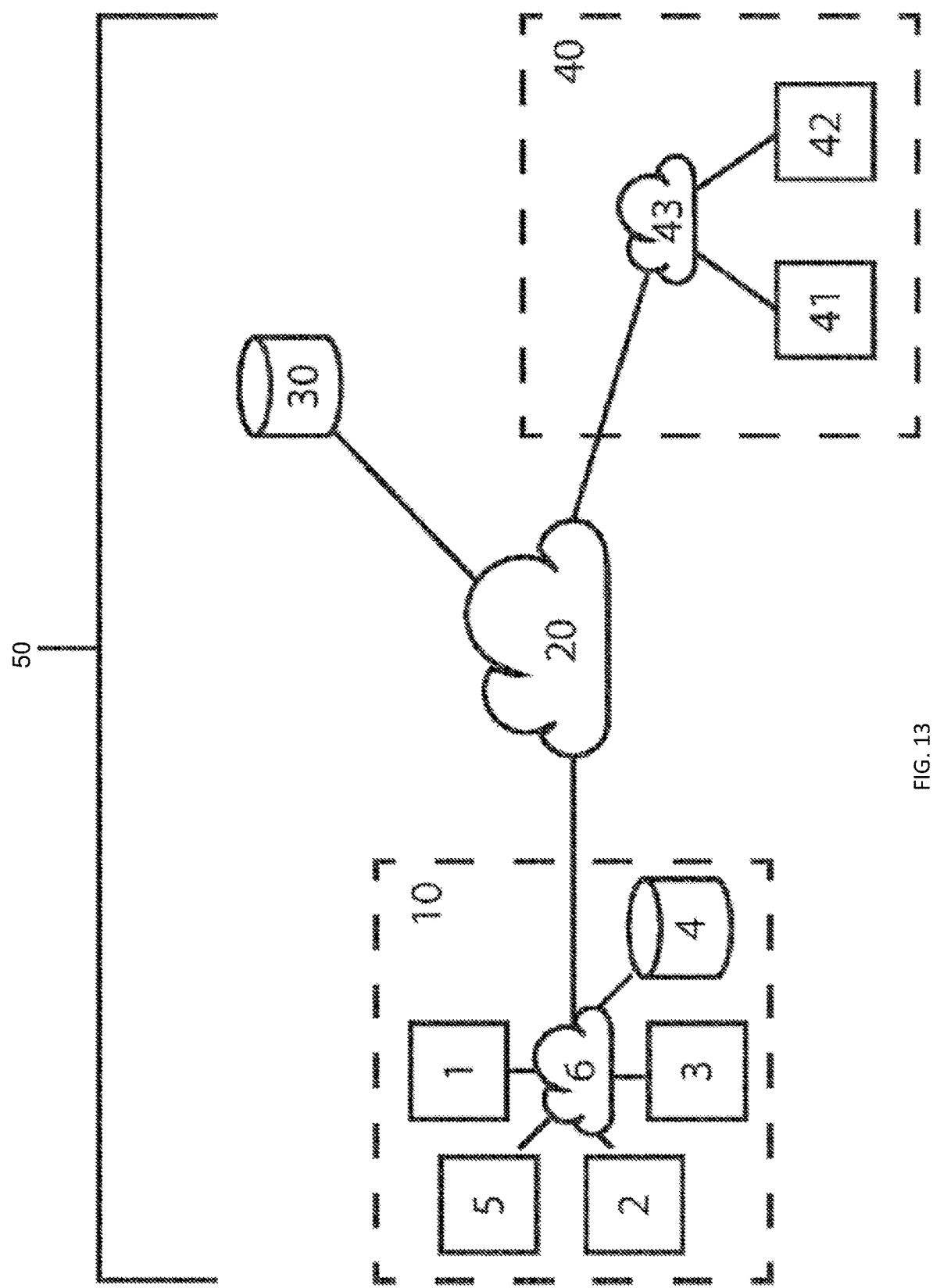

FIG. 13 illustrates an example cyber-threat defense system protecting an example network.

Figure 14:
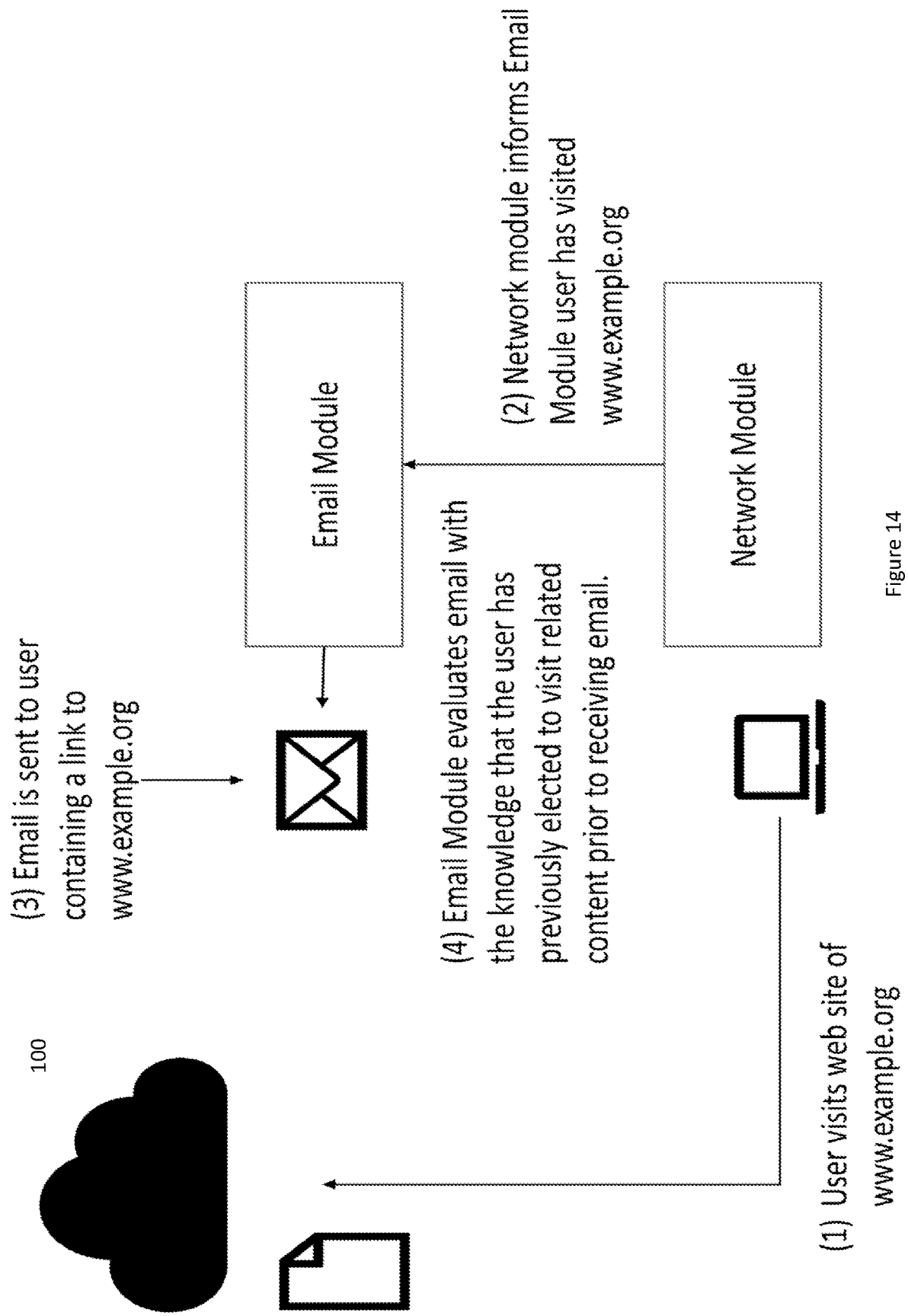

FIG. 14 illustrates an example of the network module informing the email module of a computer's network activity prior to the user of that computer receiving an email containing content relevant to that network activity.

Figure 15:
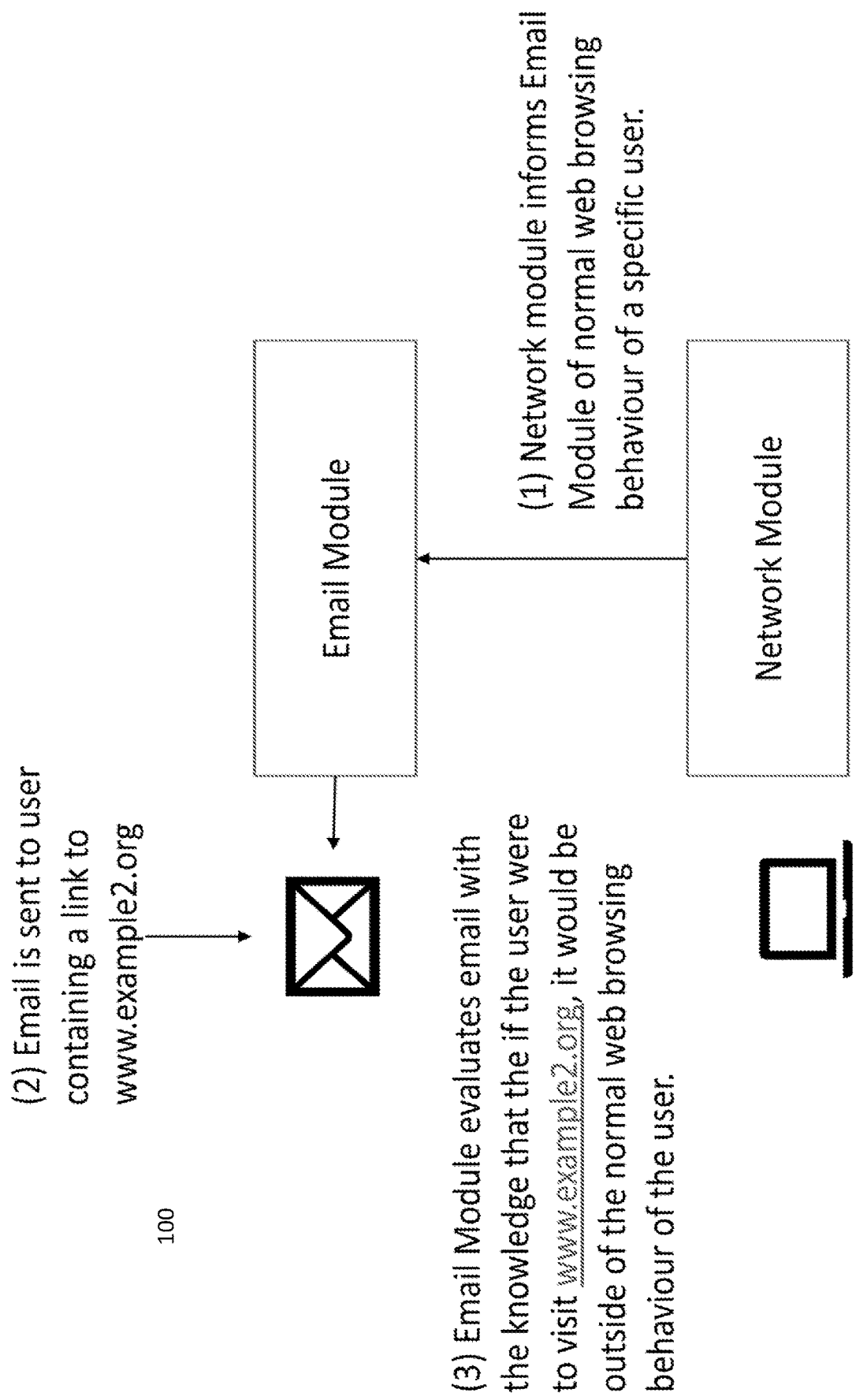

FIG. 15 illustrates an example of the network module informing the email module of the deduced pattern of life information on the web browsing activity of a computer prior to the user of that computer receiving an email which contains content which is not in keeping with that pattern of life.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, Artificial Intelligence analyzes cyber security threats. The cyber defense system can use machine learning models that are trained on a normal behavior of email activity and user activity associated with an email system. A cyber-threat module may reference the models that are trained on the normal behavior of email activity and user activity. A determination is made of a threat risk parameter that factors in the likelihood that a chain of one or more unusual behaviors of the email activity and user activity under analysis fall outside of derived normal benign behavior. An autonomous response module can be used, rather than a human taking an action, to cause one or more autonomous rapid actions to be taken to contain the cyber-threat when the threat risk parameter from the cyber-threat module is equal to or above an actionable threshold.

The cyber threat module can receive an input from two or more modules of the following modules. A mass email association module determines a likelihood that two or more highly similar emails would be i) sent from or ii) received by a collection of users in the email domain under analysis in the same communication or in multiple communications within a substantially simultaneous time period. An email similarity scoring module compares an incoming email, based on a semantic similarity of multiple aspects of the email to a cluster of different metrics derived from known bad emails to derive a similarity score between an email under analysis and the cluster of different metrics derived from known bad emails. An email layout change predictor module analyzes changes in an email layout of an email of a user in that email domain to assess whether malicious activity is occurring to an email account of that user, based on the changes in the email layout of the email deviating from a historical norm. An image-tracking link module cooperates with an image-tracking link detector to analyze the link properties that describe the link's visual style and appearance accompanying the link to detect whether the tracking link is intentionally being hidden as well as a type of query requests made by the tracking link to determine if this tracking link is a suspicious covert tracking link. The cyber threat factors in the input from at least each of these analyses above in a wide range of metadata from observed email communications to detect and determine when a deviation from the normal behavior of email activity and user activity associated with the network and its email domain is occurring and then determine what autonomous action to take to remedy against a potentially malicious email.

Figure 1A:
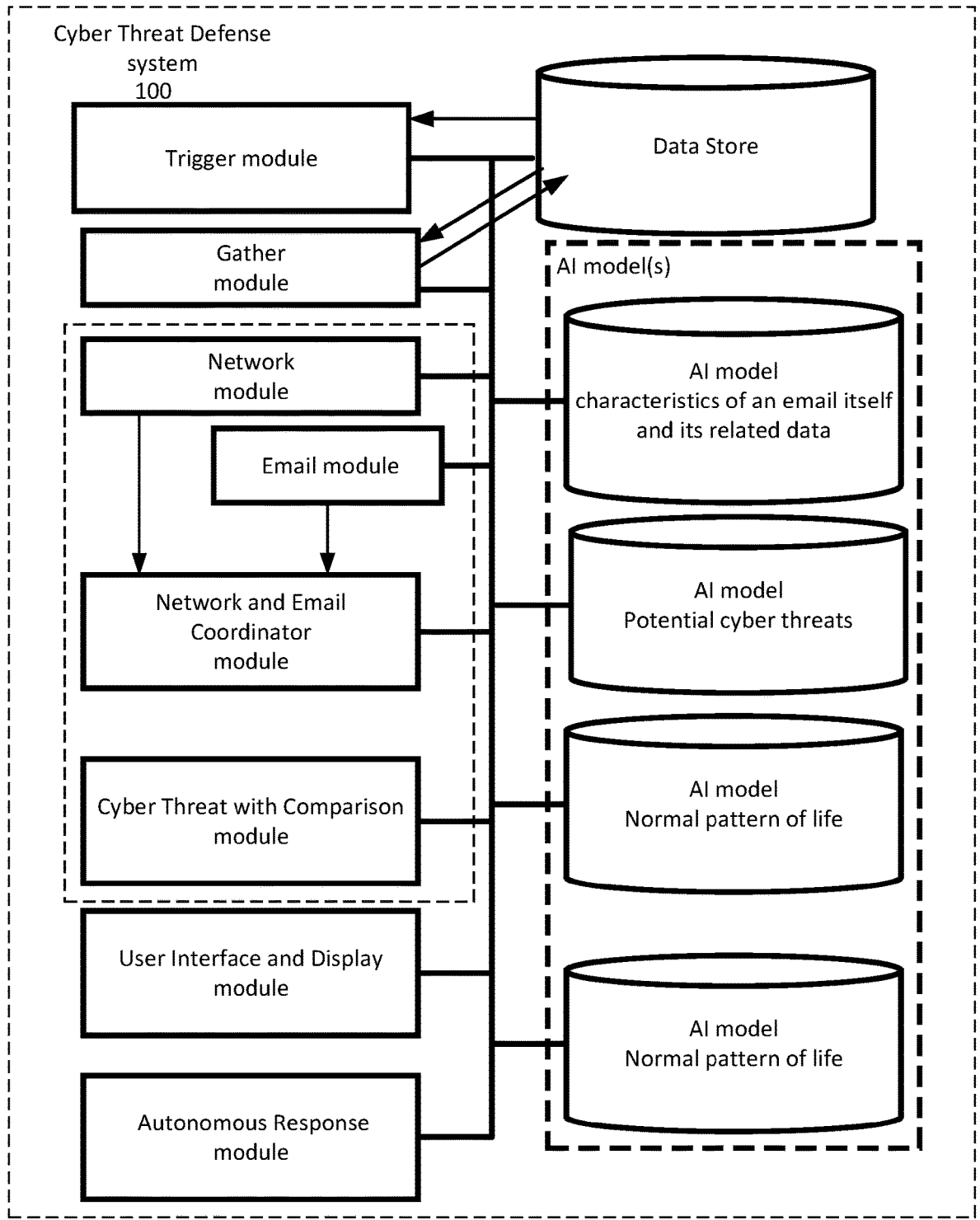
FIG. 1B illustrates a block diagram of portion of FIG. 1A showing an embodiment of a cyber-threat defense system with a cyber-threat module and a separate mass email association module, a separate email similarity scoring module, a separate email layout change predictor module, and a separate image-tracking link module.

FIG. 1A illustrates a block diagram of an embodiment of a cyber-threat defense system with a cyber-threat module that references machine learning models that are trained on the normal behavior of email activity and user activity associated with at least the email system, where the cyber-threat module determines a threat risk parameter that factors in 'the likelihood that a chain of one or more unusual behaviors of the email activity and user activity under analysis fall outside of derived normal benign behavior;' and thus, are likely malicious behavior.

The cyber-threat defense system 100 may protect against cyber security threats from an e-mail system as well as its network. The cyber-threat defense system 100 may include components such as i) a trigger module, ii) a gather module, iii) a data store, iv) a network module, v) an email module, vi) a network & email coordinator module, vii) a cyber-threat module, viii) a user interface and display module, ix) an autonomous response module, x) a mass email association module, xi) an email similarity scoring module, xii) an email layout change predictor module, xiii) an image-tracking link module, xiv) one or more machine learning models including a first Artificial Intelligence model trained on characteristics of an email itself and its related data, a second Artificial Intelligence model trained on potential cyber threats, and one or more Artificial Intelligence models each trained on different users, devices, system activities and interactions between entities in the system, and other aspects of the system, as well as xv) other similar components in the cyber-threat defense system 100.

A trigger module may detect time stamped data indicating one or more i) events and/or ii) alerts from 1) unusual or II) suspicious behavior/activity are occurring and then triggers that something unusual is happening. Accordingly, the gatherer module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the cyber-threat module.

The gatherer module may consist of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gatherer module for each possible hypothesis. A feedback loop of cooperation occurs between the gatherer module, the email module monitoring email activity, the network module monitoring network activity, the mass email association module, the email similarity scoring module, the email layout change predictor module, the image-tracking link module, and the cyber-threat module to apply one or more models trained on different aspects of this process. Each hypothesis of typical threats, e.g. human user insider attack/inappropriate network and/or email behavior, malicious software/malware attack/inappropriate network and/or email behavior, can have various supporting points of data and other metrics associated with that possible threat, and a machine learning algorithm will look at the relevant points of data to support or refute that particular hypothesis of what the suspicious activity and/or abnormal behavior related for each hypothesis on what the suspicious activity and/or abnormal behavior relates to. Networks have a wealth of data and metrics that can be collected and then the mass of data is filtered/condensed down into the important features/salient features of data by the gatherers.

Figure 1B:
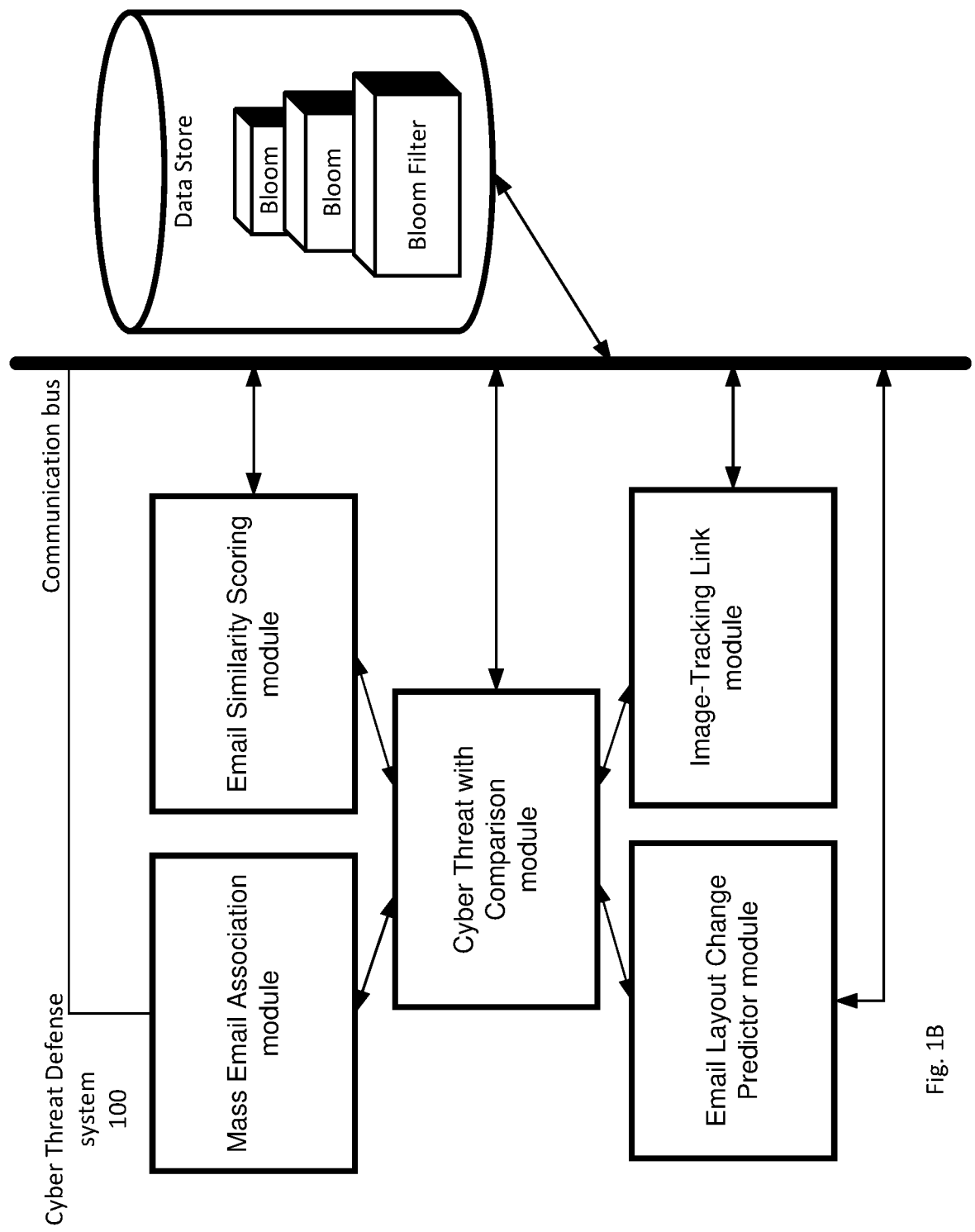

In an embodiment, the network module, the email module, and the network & email coordinator module may be portions of the cyber-threat module. In an embodiment, the mass email association module, the email similarity scoring module, the email layout change predictor module, the image-tracking link module also may be separate modules or combined into portions of a larger module. FIG. 1B illustrates a block diagram of portion of FIG. 1A showing an embodiment of a cyber-threat defense system 100 with a cyber-threat module and a separate mass email association module, a separate email similarity scoring module, a separate email layout change predictor module, and a separate image-tracking link module. A module may be implemented as an electronic hardware circuit, an executable software structure, and/or a combination of both.

The cyber-threat module may also use one or more machine learning models trained on cyber threats in the email system. The cyber-threat module may reference the models that are trained on the normal behavior of email activity and user activity associated with the email system. The cyber-threat module can reference these various trained machine learning models and data from the network module, the email module, and the trigger module. The cyber-threat module can determine a threat risk parameter that factors in how the chain of unusual behaviors correlate to potential cyber threats and 'what is a likelihood of this chain of one or more unusual behaviors of the email activity and user activity under analysis that fall outside of derived normal benign behavior;' and thus, is malicious behavior. Each of the other modules, such as the mass email association module, the email similarity scoring module, the email layout change predictor module, the image-tracking link module can supply its own input to the overall analysis by the cyber-threat module.

The one or more machine learning models can be self-learning models using unsupervised learning and trained on a normal behavior of different aspects of the system, for example, email activity and user activity associated with an email system. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

FIG. 14 illustrates a block diagram of an embodiment of the cyber-threat module comparing the analyzed metrics on the user activity and email activity compared to their respective moving benchmark of parameters that correspond to the normal behavior of email activity and user activity associated with the network and its email domain used by the self-learning machine learning models and the corresponding potential cyber threats. The cyber-threat module can then determine, in accordance with the analyzed metrics and the moving benchmark of what is considered normal behavior, a cyber-threat risk parameter indicative of a likelihood of a cyber-threat.

The cyber-threat defense system 100 may also include one or more machine learning models trained on gaining an understanding of a plurality of characteristics on an email itself and its related data including classifying the properties of the email and its metadata.

The cyber-threat module can also reference the machine learning models trained on an email itself and its related data to determine if an email or a set of emails under analysis have potentially malicious characteristics. The cyber-threat module can also factor this email characteristics analysis into its determination of the threat risk parameter.

The network module may have one or more machine learning models trained on a normal behavior of users, devices, and interactions between them, on a network, which is tied to the email system. The cyber-threat module can also factor this network analysis into its determination of the threat risk parameter.

A user interface has one or more windows to display network data and one or more windows to display emails and cyber security details about those emails through the same user interface on a display screen, which allows a cyber professional to pivot between network data and email cyber security details within one platform, and consider them as an interconnected whole rather than separate realms on the same display screen.

The cyber-threat defense system 100 may use at least three separate machine learning models. Each machine learning model may be trained on specific aspects of the normal pattern of life for the system such as devices, users, network traffic flow, outputs from one or more cyber security analysis tools analyzing the system, etc. One or more machine learning models may also be trained on characteristics and aspects of all manner of types of cyber threats. One or more machine learning models may also be trained on characteristics of emails themselves.

The email module monitoring email activity and the network module monitoring network activity may both feed their data to a network & email coordinator module to correlate causal links between these activities to supply this input into the cyber-threat module. The application of these causal links is demonstrated in the block diagrams of FIG. 14 and FIG. 15. The cyber-threat module can also factor this network activity link to a particular email causal link analysis into its determination of the threat risk parameter (see FIG. 15).

The mass email association module determines a likelihood that two or more highly similar emails that are being i) sent from or ii) received by a collection of users in the email domain under analysis in the same communication or in a substantially simultaneous time period, based on at least i) historical patterns of communication between those users, and ii) how rare the collection of users under analysis all would send and/or receive this highly similar email in roughly the substantially simultaneous time frame. The normal behavior of email activity and user activity associated with the network and its email domain can be used by the mass email association module to create a map of associations between users in the email domain to generate the probabilistic likelihood that the two or more users would be included in the highly similar emails determined by the mass email association detector. Note, this same cyber threat defense system can be used for other forms of communication e.g. text messages, chat messages, etc.; rather than merely emails.

The mass email association detector determines a similarity between two or more highly similar emails being i) sent from or ii) received by a collection of two or more individual users in the email domain in a substantially simultaneous time frame. Note, the substantially simultaneous time period may be equal to or less than a ten second difference in any of i) the time sent for each of the similar emails under analysis, and ii) the time received for each of the similar emails under analysis. The users may also be addressed or 'copied in' to the same email communication. One or more mathematical models are used to determine similarity weighing in order to derive a similarity score between compared emails. The email similarity scoring module cooperates with the one or more mathematical models in order to compare an incoming email, based on a semantic similarity of multiple aspects of the email, such as headers, subject, body, links, attachments, content, language-usage, subjects, sentence construction etc., to a cluster of different metrics derived from known bad emails to derive a similarity score between an email under analysis and the cluster of different metrics derived from known bad emails.

The email layout change predictor module analyzes changes in an email layout of an email of a user in that email domain to assess whether malicious activity is occurring to an email account of that user, based on the changes in the email layout of the email deviating from a historical norm. The email layout change predictor module detects anomaly deviations by considering two or more parameters of an email selected from group consisting of a layout of the email, a formatting of the email, a structure of an email body including any of content, language-usage, subjects, and sentence construction within the email body in order to detect a change in behavior of the email sender under analysis that is indicative of their account being compromised. The email layout change predictor module utilizes the machine learning models. One or more machine learning models are trained and configured to model and store the historical norm state of the layout, including the formatting and the structure for each sender (internal or external to the email domain). The email layout change predictor module compares this historical norm state of the layout, the formatting, and structure every time a new email is seen. The email layout change predictor module checks whether the new email about to be sent diverges more than a threshold amount from the historical norm state.

An image-tracking link detector detects an image-tracking link based on visual properties of the link (e.g. Cascading Stylesheets (CSS) properties that describe the link's visual style and appearance) as well as a purpose of any query parameters from that link. The image-tracking link module cooperates with the image-tracking link detector to analyze the link's properties that describe the link's visual style and appearance accompanying the link to detect whether the tracking link is intentionally being hidden as well as a type of query requests made by the tracking link. With this information, the image-tracking link module determines if this tracking link is a suspicious covert tracking link and then the autonomous response module takes an autonomous action to either remedy or neutralize the tracking link when determined to be the suspicious covert tracking link, while not stopping every email entering the email domain with a tracking link, or hold the email communication entirely if the covert tracking link is highly suspicious.

Again, the cyber threat module is configured to receive an input from at least each of the two or more modules above. The cyber threat module factors in the input from each of these analyses above to use a wide range of metadata from observed email communications to detect and determine when the deviation from the normal behavior of email activity and user activity associated with the network and its email domain is occurring, and then determine what autonomous action to take to remedy against a potentially malicious email. The modules communicate with the set of machine learning models. The two or more modules also are configured to receive information from the probes, including a set of detectors, to provide at least a wide range of metadata from observed email communications in the email domain. The cyber threat module cooperates with the two or more modules to analyze the wide range of metadata from the observed email communications. The cyber threat module also analyzes with the machine learning models trained on the normal behavior of email activity and user activity associated with the network and its email domain in order to determine when a deviation from the normal behavior of email activity and user activity associated with the network and its email domain is occurring.

The cyber-threat defense system 100 uses various probes to collect the user activity and the email activity and then feed that activity to the data store and as needed to the cyber-threat module and the machine learning models. The cyber-threat module uses the collected data to draw an understanding of the email activity and user activity in the email system as well as updates a training for the one or more machine learning models trained on this email system and its users. For example, email traffic can be collected by putting probe hooks into the e-mail application, such as Outlook or Gmail, and/or monitoring the internet gateway from which the e-mails are routed through. Additionally, probes may collect network data and metrics via one of the following methods: port spanning the organizations existing network equipment; inserting or re-using an in-line network tap, and/or accessing any existing repositories of network data (e.g. See FIG. 2).

The cyber threat module detects deviations from a normal behavior of email activity and user activity associated with the network and its email domain based on at least one or more AI models determining normal behavior of email activity and user activity associated with the network and its email domain; rather than, ahead of time finding out what a 'bad' email signature looks like and then preventing that known 'bad' email signature.

The cyber-threat defense system 100 takes actions to counter detected potential cyber threats. The autonomous response module, rather than a human taking an action, can be configured to cause one or more rapid autonomous actions to be taken to contain the cyber-threat when the threat risk parameter from the cyber-threat module is equal to or above an actionable threshold. The cyber-threat module cooperates with the autonomous response module to cause one or more autonomous actions to be taken to contain the cyber threat, in order to improve computing devices in the email system by limiting an impact of the cyber-threat from consuming unauthorized CPU cycles, memory space, and power consumption in the computing devices via responding to the cyber-threat without waiting for some human intervention.

The cyber-threat defense system 100 may be hosted on a device, on one or more servers, and/or in its own cyber-threat appliance platform (e.g. see FIG. 2).

FIG. 2 illustrates a block diagram of an embodiment of the cyber-threat defense system monitoring email activity and network activity to feed this data to correlate causal links between these activities to supply this input into the cyber-threat analysis. The network can include various computing devices such as desktop units, laptop units, smart phones, firewalls, network switches, routers, servers, databases, Internet gateways, the cyber-threat defense system 100, etc.

The network module uses the probes, including the set of detectors, to monitor network activity and can reference the machine learning models trained on a normal behavior of users, devices, and interactions between them or the internet which is subsequently tied to the email system.

The user interface has both i) one or more windows to present/display network data, alerts, and events, and ii) one or more windows to display email data, alerts, events, and cyber security details about those emails through the same user interface on a display screen. These two sets of information shown on the same user interface on the display screen allows a cyber professional to pivot between network data and email cyber security details within one platform, and consider them as an interconnected whole rather than separate realms.

The network module and its machine learning models are utilized to determine potentially unusual network activity in order to provide an additional input of information into the cyber-threat module in order to determine the threat risk parameter (e.g. a score or probability) indicative of the level of threat. A particular user's network activity can be tied to their email activity because the network module observes network activity and the network & email coordinator module receives the network module observations to draw that into an understanding of this particular user's email activity to make an appraisal of potential email threats with a resulting threat risk parameter tailored for different users in the e-mail system. The network module tracks each user's network activity and sends that to the network & email coordinator component to interconnect the network activity and email activity to closely inform one-another's behavior and appraisal of potential email threats.

The cyber-threat defense system 100 can now track possible malicious activity observed by the network module on an organization's network back to a specific email event observed by the e-mail module, and use the autonomous rapid response module to shut down any potentially harmful activity on the network itself, and also freeze any similar email activity triggering the harmful activity on the network.

As discussed, the probes, including the set of detectors, collect the user activity as well as the email activity. The collected activity is supplied to the data store for storage of this information and subsequently evaluated for unusual or suspicious behavioral activity, e.g. alerts, events, etc., by the modules. The collected data can also be used to potentially update the training for the one or more machine learning models trained on the normal pattern of life of user activity and email activity for this email system, its users and the network and its entities.

An example probe for the email system may be configured to work directly with an organization's email application, such as an Office 365 Exchange domain and receive a Blind Carbon Copy (BCC) of all ingoing and outgoing communications. The email module will inspect the emails to provide a comprehensive awareness of the pattern of life of an organization's email usage.

FIG. 3 illustrates a block diagram of an embodiment of an email similarity scoring module configured to cooperate with the one or more mathematical models in order to compare an incoming email, based on a semantic similarity of multiple aspects of the email, such as headers, subject, body, links, attachments, content, language-usage, subjects, sentence construction etc., to a cluster of different metrics derived from known bad emails to derive a similarity score between an email under analysis and the cluster of different metrics derived from known bad emails. Again, one or more mathematical models are configured to determine similarity weighing in order to derive a similarity score between compared emails. The email similarity scoring module cooperates with the mathematical models and compares an email under analysis to a cluster of different metrics derived from known bad emails.

The similarity to known bad emails detector looks for a cluster of different metrics derived from known bad emails (content, language-usage, subjects, sentence construction etc.), which is then compared to all inbound and/or outbound emails to derive a similarity. The known bad emails are sourced from a data set of previously observed emails by the system which were deemed clearly malicious or contained known bad content as identified by internal and external threat intelligence. A comparison is made on the multiple aspects of the email under analysis to those same multiple metrics of known bad emails. The mathematical models use an algorithm to weigh different metrics, emphasize or throw out outliers, and establish an overall similarity between multiple metrics of an email under analysis and multiple metrics of each of the known bad emails. A threshold is determined to declare the two emails are similar enough. Additional factors, such as the layout of the email changing from its historical norm, the email going to a rare grouping of multiple recipients, a presence of an image tracking link that is purposely being concealed, etc., can all be included in the analysis to lower the threshold to declare an email under analysis as potentially suspicious and needing an autonomous action to contain the email.

Note, the cyber-threat defense system 100 quickly referencing a similarity score between compared emails also allows the system to find other similar emails when the cyber threat module determines a particular email is indeed malicious in nature. Thus, the models can fairly quickly analyze similarity of emails based on headers, subject, body, links, attachments, etc. Then, even if the e-mails have different senders and recipients and possibly different subject lines, the other characteristics of the email may be mathematically deduced to be very similar. Once the email similarity scoring module finds one email determined to be malicious by the cyber threat module, then the email similarity scoring module can go out and find other similar e-mails that are also likely malicious, even if they have different aspects such as different senders and recipients. Although some changes may differ between the headers, subject line, body, links, attachments, sender, domain, etc., statistically enough overlapping similarity exists to think that the other similar e-mails are likely also suspicious e-mails. These emails are fed into the dataset to expand the awareness of 'known bad'.

Note, individual metrics derived from a known bad email can also often mutate and/or slightly change; and thus, the cluster of different metrics is analyzed together; versus, merely matching a signature of a known bad email with its fixed characteristics. The similarity to known bad emails detector looks for a cluster of different metrics derived from known bad emails (content, language-usage, subjects, sentence construction etc.), which is then compared to all inbound and/or outbound emails to derive an overall similarity for the group of metrics being compared. The email similarity scoring module also records metrics and regularly updates metrics about known bad email communications it has observed, which are then modeled and compared with new emails as they arrive to identify any similarity, detecting attacks which have slightly changed from the 'known' methodology or from new unique senders.

In addition, establishing an email similarity to aspects/characteristics of known bad emails allows 1) the cyber threat module to identify previously unknown malicious emails as well as 2) the autonomous response module to know what appropriate autonomous response actions to take against that type of attack based on successful responses to similar bad emails, from previously unseen sender emails coming to a user's inbox. The combining analysis and modeling of known bad emails, via the email similarity scoring module, and known changes in user behavior, via the layout change predictor module, as well as analysis via machine learning, allow the ability to reliably detect unknown, previously unseen emails from senders as malicious.

In addition, updating of the models occurs. The email similarity scoring module also records metrics about known bad email communications it has observed, which are then modeled, added to the collection of known bad emails, and compared with new emails as they arrive to identify any similar email including those that i) have slightly changed from the 'known' methodology and/or ii) come from new unique senders.

FIG. 4 illustrates a block diagram of an embodiment of a mass email association detector configured to determine a similarity between two or more highly similar emails being i) sent from or ii) received by a collection of two or more individual users in the email domain in a substantially simultaneous time frame, where one or more mathematical models are used to determine similarity weighing in order to derive a similarity score between compared emails. The mathematical models configured to determine similarity discussed above can determine if two or more emails are highly similar via the score from the compared metrics.

The mass email association module determines what is a likelihood for two or more highly similar emails that are being i) sent from or ii) received by a collection of individuals in the email domain under analysis in a substantially simultaneous time period. Note, the substantially simultaneous time period can be equal to or less than a ten second difference in any of i) a time sent for each of the similar emails under analysis, and ii) a time received for each of the similar emails under analysis. The mass email association module determines the likelihood based on at least i) historical patterns of communication between those individuals, ii) how rare it is for that particular collection of individuals to all send and/or receive this highly similar email in roughly a same time frame, or iii) how rare it is for individuals identified by this system as having a similar pattern of activity and communication to those receiving the communication to send and/or receive this highly similar email in roughly a same time frame. A low likelihood is indicative that the communicator of the similar email being sent out in mass had no prior association with those individuals; and is therefore, more likely to be malicious in intent.

The mass email association module creates a map of all contacts that are usually addressed in the same (or similar)

emails, for every inbound and outbound email in this email domain. This map is then used to derive a probability likelihood that the collection of individuals, e.g. two users, would be included in the same email. The email association scoring module with its mapping and algorithms allows detection of unusual combinations of recipients, whether they are unintentionally added to the email or whether this is indicative of a supply-chain compromise or an attacker attempting to add legitimacy to an attack.

The cyber threat defense system 100 for email derives a wide range of metadata from observed email communications which it analyzes with one or more machine learning models to form a 'pattern-of-life' of user activity and email activity for the email system of a given organization. This pattern-of-life recognizes and maps associations between users to generate a probabilistic likelihood that the two or more users would be included in the same communication, decreasing false positive rates and identifying intelligent attacks. This baseline 'normal' for the organization includes a fingerprint of email communications for all internal and external senders seen which is compared with any new communications to detect subtle behavioral shifts that may indicate compromise.

One or more machine learning models are trained to gain an understanding of a normal behavior of email activity and user activity associated with email domain. For example, the models train on content a user of the network views and/or sites frequented inside and outside of the network as well as checks e-mail history to see if it is probable that this email user would be receiving this particular e-mail under analysis. The models train on e-mail usage pattern of life, content style, contacts, and group associations of each e-mail users in that system. The models cooperating with the module can then determine what is the likelihood that this e-mail under analysis falls outside of that normal behavior of email activity and user activity for that e-mail user. The module's analysis is married/combined with an output from one or more machine learning models trained on gaining an understanding of all of the characteristics of each e-mail itself and its related data, classify properties of the e-mail, and what is the likelihood the e-mail under analysis falls outside of being a normal benign email. Combining both analysis can allow the mass email association module to determine a likelihood of multiple emails that are highly similar in nature being i) sent to or ii) received by, the collection of individuals targeted by that mass mailing of highly similar emails currently under analysis, all sent out at about the same time. The e-mail may be highly similar in nature when a comparison of the emails indicate that they have, for example, similar content, similar subject line, similar sender and/or domain, etc.; and thus, share many similar characteristics.

Note, the cyber threat defense system can also factor associations and anomalies that do not correspond to associations for that email account and/or user. The cyber threat defense system works out whom the email account and/or the user know such as in their contacts, whom the email account and/or the user communicate with, and other factors like e-mail addresses from a same organization. Thus, the cyber threat defense system can work out, in essence, how many degrees of separation exist between the sender of an e-mail and the email account and/or user. The cyber threat defense system can then use these associations as a factor in the determination of how likely would it be that a substantially similar email would be sent to or be received by that set of e-mail recipients. The module factors into the likelihood determination factors such as historical trends for that network for associations, entries in the users list of contacts, how close in time the emails are sent, similarity in content and other aspects, how unusual that collection of individual are being grouped together in this email, etc.

FIG. 5 illustrates a block diagram of an embodiment of an email layout change predictor module configured to analyze changes in an email layout of an email of a user in that email domain to assess whether malicious activity is occurring to an email account of that user, based on the changes in the email layout of the email deviating from a historical norm.

The email layout change predictor module detects anomalies by considering a layout, formatting (font, spacing, etc.) and structure of an email body (content, language-usage, subjects, sentence construction etc.) in order to detect a change in behavior of the email sender under analysis that is indicative of their account being compromised, such as the email account being hijacked. One or more machine learning models are trained and configured to model and store a "normal" state of the layout, formatting and structure for each sender (internal or external) and compares this "normal" state of layout, formatting and structure every time a new email is seen to check if the new email about to be sent diverges from the "normal" state. The email layout change predictor module gives the cyber threat module an ability to detect subtle anomaly in emails from known correspondents, and then notifying a user of a potential supply chain compromise. The email layout change predictor module can use models trained with unsupervised learning and a predictor model to detect these subtle anomaly in emails.

Emails can be customized with, for example, CSS formatting to change fonts, pictures and add layout elements such as a signature or footer, and have a historical structure (e.g. typical sentence structure, grammar, word choice, etc.) A user will generally send emails which contain the same formatting features almost every time because many organizations will have standardized email templates used by all staff with features such as a confidentiality disclaimer or required font.

In an example scenario, a user consistently receives emails from their accountant which use the company-mandated font, have a signature with the company logo, and a footer containing a confidentiality disclaimer. In this example of a suspicious email, the user now receives an email from their accountant which contains no footer, no signature or logo, and contains a different phrasing than in the past emails. This sudden change in layout and formatting provides a meaningful indicator that a malicious individual may have gained access to the accountant's email address, or the email may have been sent by a spambot of some sort.

The layout change predictor is part of a wider contextual matrix of user behavior, and the notable change in behavior described above is combined with other metrics which may be an indicator that a stranger or malicious individual is sending on behalf of that user.

For every email observed by the cyber threat defense system 100, the system derives certain metrics from the nature of the formatting (such as, but absolutely not limited to, the font used, the spacing, the paragraph styles, any images or tables etc.). These metrics are fed to an analyzer which uses unsupervised machine learning to establish a baseline of normal formatting for a user which is updated regularly (such as daily, but could be a lot more frequent). The analyzer outputs a prediction of a standard model of that users behavior which is compared to the metric values seen in the observed email, and a level of anomaly is outputted a) as an overall % score for implementation in detection logic, b) as individual scores for each metric which is fed to further machine learning analyzers which look at the overall unusualness of user behavior.

Note, the data store can use one or more bloom filters. The Matryoshka-like bloom filters are configured with a nesting structure to wrap bloom filters within each other in order to provide a method of rapidly and efficiently storing commonality data for any of i) a large number of domains, ii) a large number of hostnames, and iii) other information regarding observed in email traffic using the bloom filters and then being able to rapidly look up and retrieve that data. The Matryoshka bloom filters are used to store intelligence known from the network about, for example, links observed in email traffic, all of which is stored in a compressed manner due to the nesting structure of the bloom filters, and are then queried to rapidly establish whether, for example, a link is 'rare' and/or other information is rare for this network.

The bloom filters with a nesting structure store a score for a large number of domains or hostnames in a compact data structures for the purposes of quickly and efficiently looking up commonality. These bloom filters are a data structure designed to tell you, rapidly and in a memory-efficiently way, whether an element is present in a set. Thus, the bloom filter is a space-efficient probabilistic data structure that is used to test whether a piece of data is a member of a set stored in that probabilistic data structure. The cyber threat defense system can use nesting bloom filters in order to store similar occurrences for a large amount of data in multiple hierarchical probabilistic data structures. The structure of these bloom filters wrap multiple bloom filters within each other to establish rarity. As such, the structure of these bloom filters can use bloom filter depth to indicate rarity, for example, hostname rarity. The modules can use a presumption that the rarer a host name then greater the likelihood that the email from that hostname is malicious. The modules can also factor in that if a bad email has been detected from same hostname, then emails subsequently from that hostname are more likely to be malicious as well.

The email module communicates with the network module to receive information about links and external locations accessed by internal users, which it combines with its own intelligence about links observed in email traffic, all of which is stored in a compressed manner and can be queried to establish whether something is 'rare'. These bloom filters with the nesting structure give the system a rolling 'memory' of domains seen by the email module within emails and from links as well as host domains seen by the network module on the network, allowing the email module to correlate the two.

The wrapping of bloom filters within each other creates a nesting structure. The depth of structure in the bloom filters indicates how common the URL is, with a shallow depth indicating a rare occurrence and a deeper depth indicating a common occurrence. Again, the link rarity is a contributing factor in determining whether an email is potentially malicious or not, as well as contributing to an overall score of malicious nature of an incoming email, which assists in determining what type of autonomous response action should be taken.

In an embodiment, the data store uses the bloom filters to store a score for a large number of domains and/or hostnames in a compact data structure for the purposes of quickly and efficiently looking up commonality. In an example, the Matryoshka-like bloom filter can be configured to look up quickly a score of how often a URL is visited. The Matryoshka-like bloom filter computes hashes of each URL and then uses those hashes to index into an array of bits. The hashes indicate where to look in the array and this in turn can determine the score of how often a URL is visited. The Matryoshka-like bloom filter prevents from having to look up URLs on a very long list of URLs (e.g. millions of URLs) and then store that long list for each incidence, which requires occupying a lot of memory space. The system can query an individual URL against the array and the nesting bloom filter will return a score representing the overall URL rarity.

Thus, the bloom filter may compute a number of hashes from the input, and use each of these as an index to look up numerical scores stored in the array. The output of the nesting filter is the minimum score seen over all of these locations. The bloom filter may also take in hashes and compare these to the data stored in the multilevel hierarchy and then return a numeric score of the position within the nested hierarchy to establish the rarity of that data. A variable score output can be generated as opposed to merely a 'yes' or 'no'; 'true' or 'false' answer from these nested bloom filters.

These look ups can check if this data has been seen before by comparing the hash to the large amount of data in the nested structure. For example, the nesting bloom filters can quickly look up 10 million URLs to obtain a numerical score on how often each one of these URLs can been seen. These look ups occur faster in time than scanning a long simple list of previous data, such as URL's seen before, and require far less memory usage.

In an embodiment, the Matryoshka-like bloom filters can be organized into similar categories of data in a nesting manner. The category of storing can be, for example, a nesting type bloom filter to obtain a score of how popular a given URL is. In an example embodiment, the Matryoshka-like bloom filters, in a nesting way, stores similar occurrence data for a large number of domains or hostnames. The Matryoshka-like bloom filters may look up to check if this data has been seen before. The Matryoshka-like bloom filters can be organized into several bloom filters: a first bloom filter populated with common URL occurrences/commonly accessed URLs; a second bloom filter populated with uncommon URL occurrences/commonly accessed URLs; and a third bloom filter populated with rare URL occurrences/rarely accessed URLs. Any query is hierarchically organized so that the look up begins with all accessed URLs initially and then, a look up occurs in the uncommonly accessed URLs, and then the commonly accessed URLs, etc. until the URL is not present in the filter. The depth of presence indicates how common the URL is, with shallow depth indicating rarity. A query can be made to test whether individual URLs are present against an array of possible URLs in one or more of the Matryoshka-like bloom filters.

The Matryoshka-like bloom filters are compact in size in order to easily get data from one place and send that data to another place across a network.

FIG. 6 illustrates a block diagram of an embodiment of an image-tracking link detector that detects image-tracking links based on visual properties of the link (e.g. Cascading Stylesheets (CSS) properties that describe the links visual style and appearance) as well as a purpose of any query parameters. The image-tracking link module cooperating with one or more trained models analyzes the visual style and appearance accompanying the link, such as the CSS properties, to detect whether the tracking link is intentionally being hidden. The image-tracking link module cooperates with one or more trained models analyze the type of query requests made by the tracking link to determine whether this tracking link is a suspicious tracking link. When a link queries for images or an associated file from the link, then it is less likely that the tracking link is mainly just being sent to track the email destination and open status.

The image-tracking link module detects image tracking links based at least on CSS parameters and query parameters coming from that tracking link. Emails sent with image-tracking links can be meant to deduce whether a recipient has opened and perhaps read a given email, specifically that email. Whenever the tracked email is opened, an image which may be tiny or invisible associated with the image-tracking link embedded in the e-mail is rendered, and a URL will be called. The opening and reading of the e-mail is captured as an event by the server that the image-tracking link is associated with. The image-tracking link can be used by a sender of the e-mail such as advertisers as well as malicious actors to know when a given e-mail has been opened and which recipient has opened that given e-mail. Use of the image-tracking link can also indicate whether or not that email is reaching a given recipient's inbox or is getting caught in, for example, a spam filter, as very few people open emails in their spam folder. The image-tracking link module can detect these image tracking links and potentially determine if the tracking link is benign or malicious in nature.

The image-tracking link module examines an email for both a link itself as well as the link query structure and containers the link is nested within in order to deduce whether that link is actually an image-tracking link. The outcome of that determination is then a metric that is fed into one or more machine learning models in the cyber-threat defense system 100.

The machine learning models can use this metric as well as other metrics to assist in determining whether this particular email is a benign or a malicious email. The machine learning models looking at many metrics allows a high accuracy determination. The image-tracking link module detects potential image-tracking links based on at least CSS and query parameters to allow a high accuracy in detecting whether a link in an e-mail is an image-tracking link or not. The image-tracking link module looks at both the link itself, the structuring container around that link and the structuring container of the parent containers in order to make a determination of whether this tracking link is an image-tracking link. The image-tracking link module detects and determines whether the link is purposely being concealed or not.

Thus, the image-tracking link module cooperates with the image-tracking link detector to analyze the link's properties that describe the link's visual style and appearance accompanying the link to detect whether the tracking link is intentionally being hidden as well as a type of query requests made by the tracking link to determine whether this tracking link is a suspicious covert tracking link and then take an autonomous action to remedy the tracking link when determined to be the suspicious covert tracking link while not stopping every email entering the email domain with a tracking link but merely neutralizing tracking links or preventing those with tracking links deemed malicious.

Previous detectors may exist for tracking links but they do not use this methodology in order i) to make targeted actions of disabling the link while allowing that email to pass onto the user's account as well as ii) to not restrict a normal flow of emails into the email domain by not stopping every email with a tracking link but merely emails with suspicious tracking links and then taking an action one those few emails with suspicious tracking links. Thus, the image-tracking link module cooperating with the one or more models may locate covert tracking links in email communications and action those links, filtering out unwanted portions of that mail, and protecting the end user from tracking-link based attacks. The one or more models can be trained on ways image tracking links are implemented and their characteristics.

In an embodiment, the CSS tracking link functionality allows us to better identify spam mail and those with malicious tracking links inbuilt. The image-tracking link module examines an email for both a link itself as well as the structure and containers around the link in order to deduce whether that link is actually an image-tracking link. The image-tracking link module detects visual characteristics of an image tracking link in an email including its pixel size, coloring, etc. to see if that link is trying to be hidden within the email.

Spam and general "malvertising" tracking links may be implemented as single pixel tracking links (hard visually to see) and/or otherwise by utilizing color or font size, properties in displaying the link, render it purposely hidden from the viewer of the email (e.g. using a small green font for the link in a green background portion of the email). Note, examining the visual aspects of the link in the context of the current appearance of the email can help to easily sift out spam. Additionally, some malware campaigns use a tracking cookie to confirm an email address is 'live' before attacking, so blocking these links is very important. The CSS tracking link functionality allows the image-tracking link module to better identify spam mail and those with malicious tracking links inbuilt.

Note, Cascading Stylesheets (CSS) can be used to set style content and layout of content and understanding the CSS can help in the analysis. For example, the CSS can alter the font, color, size, and spacing of your content, split it into multiple columns, or add animations and other decorative features. The cyber threat defense system can use one or more machine learning models that are trained on voluminous amounts of different image-tracking links and characteristics of image-tracking links and the structure and containers of image-tracking links. This method of identifying image-tracking links in order to detect the presence of a suspicious image-tracking link can help the models identify malicious emails harboring harmful links, and/or malicious attachments. Again, many metrics are used to determine whether an email contains harmful or malicious content attachments or links but this determination on identifying a potential tracking link is one of the metrics used to make that determination. Thus, the cyber threat defense system can detect image tracking links (and other similar mechanisms) by examining the link itself and implicitly by examining the structure in container around that link assists in confidently identifying a potential tracking link. The image tracking link in an email can be used to i) find out whether or not this email has been read by your recipients, ii) also indicate whether or not this email is reaching a user's inbox or are getting caught in a spam filter, as very few people open emails in their spam folder, iii) etc.; and thus, is a great way to gather insight about this email.

The one or more models can be trained on ways image-tracking links are implemented and their characteristics. For example, below is an example way an e-mail with an image-tracking link can be implemented:

i) Create a standard webapp driven URL in the email tracking link that accepts the tracking information via the URL or in parameters, but always return an image content type and corresponding binary image data (such as 'image/gif', and usually a pixel transparent .gif).

ii) Embed the URL as the src of a tag in all outgoing emails that are being tracked, adding appropriate information to the URL to identify the email, end recipient and information that are being tracked. The src attribute can specify the URL of the image.

iii) Because the returned content type is an image, it will render properly as an image. Thus, whenever the tracked email is opened, then that tiny invisible image is rendered, and the URL will be called. The opening and reading of the e-mail is captured as an event and then stored in a database.

FIG. 7 illustrates a block diagram of an embodiment of the cyber-threat module determining a threat risk parameter that factors in how the chain of unusual behaviors correlate to potential cyber threats and 'the likelihood that this chain of one or more unusual behaviors of the email activity and user activity under analysis fall outside of derived normal benign behavior;' and thus, is malicious behavior.

The user interface 150 can graphically display logic, data, and other details that the cyber-threat module goes through.

The user interface 150 displays an example email that when undergoing analysis exhibits characteristics, such as header, address, subject line, sender, recipient, domain, etc. and/or behavior that are not statistically consistent with the normal email activity for this user in this email domain. Thus, the user interface 150 displays an example email's unusual activity that has it classified as a behavioral anomaly.

During the analysis, the email module can reference the one or more machine learning models that are self-learning models trained on a normal behavior of email activity and user activity associated with an email system. This can include various e-mail policies and rules that are set for this email system. The cyber-threat module may also reference the models that are trained on the normal characteristics of the email itself. The cyber-threat module can apply these various trained machine learning models to data including metrics, alerts, events, metadata from the network module and the email module. In addition, a set of AI models may be responsible for learning the normal behavior of email activity and user activity for internal and external address identities in connection with the rest of the network, for each email user (see e.g. FIG. 12 for a visual display of this data). This allows the system to neutralize malicious emails which deviate from the normal 'pattern of life' for a given address identity for that user in relation to its past, its peer group, and the wider organization.

Next, the email module has at least a first email probe to inspect an email at the point it transits through the email application, such as Office 365, and extracts hundreds of data points from the raw email content and historical email behavior of the sender and the recipient. These metrics are combined with pattern of life data of the intended recipient, or sender, sourced from the data store. The combined set of the metrics are passed through machine learning algorithms to produce an anomaly score of the email, and various combinations of metrics will attempt to generate notifications which will help define the 'type' of email.

Email threat alerts, including the type notifications, triggered by anomalies and/or unusual behavior of 'emails and any associated properties of those emails' are used by the cyber-threat module to better identify any network events which may have resulted from an email borne attack.

In conjunction with the specific threat alerts and the anomaly score, the system may provoke actions upon the email designed to prevent delivery of the email or to neutralize potentially malicious content.

FIG. 8 illustrates a block diagram of an embodiment of the cyber-threat defense system referencing one or more machine learning models trained on gaining an understanding of a plurality of characteristics on an email itself and its related data including classifying the properties of the email and its metadata. The email module system extracts metrics from every email inbound and outbound.

The user interface 150 can graphically display logic, data, and other details that the cyber-threat defense system goes through. The cyber-threat module in cooperation with the machine learning models analyzes these metrics in order to develop a rich pattern of life for the user activity and email activity in that email system. This allows the cyber-threat module in cooperation with the email module to spot unusual anomalous emails and/or behavior that have bypassed/gotten past the existing email gateway defenses.

The email module detects emails whose content is not in keeping with the normal pattern of content as received by this particular recipient.

An example analysis may be as follows.

To what level has the sender of this email been previously communicated with from individuals within the receiving organization?

How closely are the recipients of this mail related to those individuals who have previously communicated with the sender?

Is the content of this email consistent with other emails that the intended recipient sends or receives?

If any links or attachments present in the email were to be clicked or opened by the intended recipient, would this constitute anomalous activity for that individual's normal network behavior?

Are the email properties consistent with this particular user's recent network activities?

Thus, the cyber-threat module can also reference the machine learning models trained on an email itself and its related data to determine if an email or a set of emails under analysis have potentially malicious characteristics. The cyber-threat module can also factor this email characteristics analysis into its determination of the threat risk parameter.

The email module can retrospectively process an email application's metadata, such as Office 365 metadata, to gain an intimate knowledge of each of their users, and their email addresses, correspondents, and routine operations. The power of the cyber-threat module lies in leveraging this unique understanding of day-to-day user email behavior, of each of the email users, in relation to their past, to their peer group, and to the wider organization (see e.g. FIG. 12 for a visual representation of an email address's association data). Armed with the knowledge of what is 'normal' for a specific organization and specific individual, rather than what fits a predefined template of malicious communications, the cyber-threat module can identify subtle, sophisticated email campaigns which mimic benign communications and locate threats concealed as everyday activity.

Next, the email module provides comprehensive email logs for every email observed. These logs can be filtered with complex logical queries and each email can be interrogated on a vast number of metrics in the email information stored in the data store.

Some example email characteristics that can be stored and analyzed are:

Email direction: Message direction—outbound emails and inbound emails.

Send Time: The send time is the time and date the email was originally sent according to the message metadata.

Links: Every web link present in an email has its own properties. Links to web sites are extracted from the body of the email. Various attributes are extracted including, but not limited to, the position in the text, the domain, the frequency of appearance of the domain in other emails and how it relates to the anomaly score of those emails, how well that domain fits into the normal pattern of life of the intended recipient of the email, their deduced peer group and their organization.

Recipient: The recipient of the email. If the email was addressed to multiple recipients, these can each be viewed as the 'Recipients'. The known identifying properties of the email recipient, including how well known the recipient was to the sender, descriptors of the volume of mail, and how the email has changed over time, to what extent the recipient's email domain is interacted with inside the network.

Subject: The email subject line.

Attachment: Every attachment associated with the message will appear in the user interface here as individual entries, with each entry interrogatable against both displayed and advanced metrics. These include, but are not limited to, the attachment file name, detected file types, descriptors of the likelihood of the recipient receiving such a file, descriptors of the distribution of files such of these in all email against the varying anomaly score of those emails.

Headers: Email headers are lines of metadata that accompany each message, providing key information such as sender, recipient, message content type for example.

FIG. 14 illustrates an example of the network module informing the email module of a computer's network activity prior to the user of that computer receiving an email containing content relevant to that network activity.

FIG. 15 illustrates an example of the network module informing the email module of the deduced pattern of life information on the web browsing activity of a computer prior to the user of that computer receiving an email which contains content which is not in keeping with that pattern of life. The cyber-threat defense system 100 merges network knowledge with email knowledge to better understand what is normal and expected and what is unusual via the network module communicating with the email module.

In FIG. 9, the user interface can display a graph 220 of an example chain of unusual behavior for the email(s) in connection with the rest of the network under analysis.

The network & email module can tie the alerts and events from the email realm to the alerts and events from the network realm.

The cyber-threat module cooperates with one or more machine learning models. The one or more machine learning models are trained and otherwise configured with mathematical algorithms to infer, for the cyber-threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network/system/device/user/email under analysis by the cyber-threat module and the machine learning models. The cyber defense system uses unusual behavior deviating from the normal behavior and then builds a chain of unusual behavior and the causal links between the chains of unusual behavior to detect cyber threats. An example behavioral pattern analysis of what are the unusual behaviors may be as follows. The unusual pattern may be determined by filtering out what activities/events/alerts that fall within the window of what is the normal pattern of life for that network/system/device/user/email under analysis, and then the pattern of the behavior of the activities/events/alerts that are left, after the filtering, can be analyzed to determine whether that pattern is indicative of a behavior of a malicious actor—human, program, email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident is the defense system in this assessment of identifying whether the unusual pattern was caused by a malicious actor is created. Next, also assigned is a threat level parameter (e.g. score or probability) indicative of what level of threat does this malicious actor pose to the system. Lastly, the cyber-threat defense system is configurable in its user interface of the defense system on what type of automatic response actions, if any, the defense system may take when different types of cyber threats that are equal to or above a configurable level of threat posed by this malicious actor.

The cyber-threat module may chain the individual alerts and events that form the unusual pattern into a distinct item for cyber-threat analysis of that chain of distinct alerts and/or events. The cyber-threat module may reference the one or more machine learning models trained on e-mail threats to identify similar characteristics from the individual alerts and/or events forming the distinct item made up of the chain of alerts and/or events forming the unusual pattern.

One or more machine learning models may also be trained on characteristics and aspects of all manner of types of cyber threats to analyze the threat risk associated with the chain/cluster of alerts and/or events forming the unusual pattern. The machine learning technology, using advanced mathematics, can detect previously unidentified threats, without rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived each producing time series data for the given metric.

The detectors in the cyber-threat module including its network module and email module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber-threat defense system mathematically characterizes what constitutes 'normal' behavior based on the analysis of a large number/set of different measures of a device's network behavior. The cyber-threat defense system can build a sophisticated 'pattern of life'—that understands what represents normality for every person, device, email activity, and network activity in the system being protected by the cyber-threat defense system.

As discussed, each machine learning model may be trained on specific aspects of the normal pattern of life for the system such as devices, users, network traffic flow, outputs from one or more cyber security analysis tools analyzing the system, email contact associations for each user, email characteristics, etc. The one or more machine learning models may use at least unsupervised learning algorithms to establish what is the normal pattern of life for the system. The machine learning models can train on both i) the historical normal distribution of alerts and events for that system as well as ii) factored in is a normal distribution information from similar peer systems to establish the normal pattern of life of the behavior of alerts and/or events for that system. Another set of machine learning models train on characteristics of emails and the activities and behavior of its email users to establish a normal for these.

Note, when the models leverage at least two different approaches to detecting anomalies: e.g. comparing each system's behavior to its own history, and comparing that system to its peers' history and/or e.g. comparing an email to both characteristics of emails and the activities and behavior of its email users, this multiple source comparison allows the models to avoid learning existing bad behavior as 'a normal' because compromised devices/users/components/emails will exhibit behavior different to their immediate peers.

In addition, the one or more machine learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts and/or events, which allows the detection of previously unidentified cyber threats compared to finding cyber threats with merely predefined descriptive objects and/or signatures. Thus, increasingly intelligent malicious cyber threats that try to pick and choose when they take their actions in order to generate low level alerts and event will still be detected, even though they have not yet been identified by other methods of cyber analysis. These intelligent malicious cyber threats can include malware, spyware, key loggers, malicious links in an email, malicious attachments in an email, etc. as well as nefarious internal information technology staff who know intimately how to not set off any high level alerts or events.

In essence, the plotting and comparison is a way to filter out what is normal for that system and then be able to focus the analysis on what is abnormal or unusual for that system. Then, for each hypothesis of what could be happening with the chain of unusual events and/or alerts, the gatherer module may gather additional metrics from the data store including the pool of metrics originally considered 'normal behavior' to support or refute each possible hypothesis of what could be happening with this chain of unusual behavior under analysis.

Note, each of the individual alerts and/or events in a chain of alerts and/or events that form the unusual pattern can indicate subtle abnormal behavior; and thus, each alert and/or event can have a low threat risk associated with that individual alert and/or event. However, when analyzed as a distinct chain/grouping of alerts and/or events behavior forming the chain of unusual pattern by the one or more machine learning models, then that distinct chain of alerts and/or events can be determine to now have a much higher threat risk than any of the individual alerts and/or events in the chain.

Note, in addition, today's cyberattacks can be of such severity and speed that a human response cannot happen quickly enough. Thanks to these self-learning advances, it is now possible for a machine to uncover these emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine learning constantly revisits assumptions about behavior, using probabilistic mathematics. The cyber-threat defense system's unsupervised machine learning methods do not require training data with pre-defined labels. Instead, they are able to identify key patterns and trends in the data, without the need for human input.

The cyber-threat defense system 100 may use at least three separate machine-learning models. Each machine-learning model may be trained on specific aspects of the normal pattern of life for the system such as devices, users, network traffic flow, outputs from one or more cyber security analysis tools analyzing the system, etc. One or more machine learning models may also be trained on characteristics and aspects of all manner of types of cyber threats. One or more machine learning models may also be trained on characteristics of emails themselves. In an embodiment, the one or more models may be trained on specific aspects of these broader concepts. For example, the models may be specifically trained on associations, attachments, compliances, data loss & transfers, general, metadata, hygiene, links, proximity, spoof, type, validation, and other anomalies.

In addition, the one or more machine learning models can be self-learning using unsupervised learning algorithms. For example, a set of the one or more machine learning models can be trained on the normal behavior of users and their emails use data from the probes to train on; and therefore, regularly update what a base line for the normal behavior is. This autonomous, self-learning defense system protects against malicious activity in the email domain—whether the malicious activity is from any of i) standard threat actors from email, such as phishing and malware emails, and ii) insider threat from users, which does not rely solely on pre-recognized, arbitrary ideas of malicious email domain activity but instead autonomously contextualizes each communication to assess its anomaly compared to standard behavior of the user and organization.

FIG. 10 illustrates a block diagram of an embodiment of an example window of the user interface with an inbox-style view of all emails coming in/out of an email domain and the cyber security characteristics known about one or more e-mails under analysis.

The user interface 150 allows emails in the e-mail system to be filterable, searchable, and sortable, configured in appearance to be in a style like an email application's user interface 150 that a typical user is familiar with. The user interface 150 allows emails in the e-mail system to be filterable, searchable, and sortable to customize and target the one or more emails under analysis in the first window and then show alongside a second window with the relevant security characteristics known about those one or more emails. Thus, these two windows display their respective information on the same display screen with this user interface 150 to allow a cyber professional analyzing the emails under analysis to better assess whether those one or more emails are in fact a cyber threat. The user interface 150 gives a cyber professional the ability to investigate and customize very complex machine learning and then see the resulting analysis of an email or a set of emails in a graphical user interface 150 that is easy to grasp and familiar in appearance.

FIG. 11 illustrates a block diagram of an embodiment of example autonomous actions that the autonomous rapid response module can be configured to take without a human initiating that action.

The autonomous rapid response module is configurable, via the user interface 150, to know when it should take the autonomous actions to contain the cyber-threat when i) a known malicious email or ii) at least highly likely malicious email is determined by the cyber-threat module. The autonomous rapid response module has an administrative tool, configurable through the user interface, to program/set what autonomous actions the autonomous rapid response module can take, including types of actions and specific actions the autonomous rapid response module is capable of, when the cyber-threat module indicates the threat risk parameter is equal to or above the actionable threshold, selectable by the cyber professional, that the one or more emails under analysis are at least highly likely to be malicious.

The types of actions and specific actions the autonomous rapid response module customizable for different users and parts of the system; and thus, configurable for the cyber professional to approve/set for the autonomous rapid response module to automatically take those actions and when to automatically take those actions.

The autonomous rapid response module has a library of response actions types of actions and specific actions the autonomous rapid response module is capable of, including focused response actions selectable through the user interface 150 that are contextualized to autonomously act on specific email elements of a malicious email, rather than a blanket quarantine or block approach on that email, to avoid business disruption to a particular user of the email system. The autonomous rapid response module is able to take measured, varied actions towards those email communications to minimize business disruption in a reactive, contextualized manner.

The autonomous response module works hand-in-hand with the AI models to neutralize malicious emails, and deliver preemptive protection against targeted, email-borne attack campaigns in real time.

The cyber-threat module cooperating with the autonomous response module can detect and contain, for example, an infection in the network, recognize that the infection had an email as its source, and identify and neutralize that malicious email by either removing that from the corporate email account inboxes, or simply stripping the malicious portion of that before the email reaches its intended user. The autonomous actions range from flattening attachments or stripping suspect links, through to holding emails back entirely if they pose a sufficient risk.

The cyber-threat module can identify the source of the compromise and then invoke an autonomous response action by sending a request to the autonomous response model. This autonomous response action will rapidly stop the spread of an emerging attack campaign, and give human responders the crucial time needed to catch up.

In an embodiment, initially, the autonomous response module can be run in human confirmation mode—all autonomous, intelligent interventions must be confirmed initially by a human operator. As the autonomous response module refines and nuances its understanding of an organization's email behavior, the level of autonomous action can be increased until no human supervision is required for each autonomous response action. Most security teams will spend very little time in the user interface 150 once this level is reached. At this time, the autonomous response module response action neutralizes malicious emails without the need for any active management. The autonomous response module may take one or more proactive or reactive action against email messages, which are observed as potentially malicious. Actions are triggered by threat alerts or by a level of anomalous behavior as defined and detected by the cyber-security system and offer highly customizable, targeted response actions to email threats that allows the end user to remain safe without interruption. Suspect email content can be held in full, autonomously with selected users exempted from this policy, for further inspection or authorization for release. User behavior and notable incidents can be mapped, and detailed, comprehensive email logs can be filtered by a vast range of metrics compared to the model of normal behavior to release or strip potentially malicious content from the email.

Example Possible Actions

The following selection of example actions, categorized into delivery actions, attachment actions, link actions, header and body actions, etc., appear on the dashboard and can be taken by or at least suggested to be taken by the autonomous response module when the threat risk parameter is equal to or above a configurable set point set by a cyber security professional:

Hold Message: The autonomous response module has held the message before delivery due to suspicious content or attachments. Held emails can be reprocessed and released by an operator after investigation. The email will be prevented from delivery, or if delivery has already been performed, removed from the recipient's inbox. The original mail will be maintained in a buffered cache by the data store and can be recovered, or sent to an alternative mailbox, using the 'release' button in the user interface 150.

Lock Links: The autonomous response module replaces the URL of a link such that a click of that link will first divert the user via an alternative destination. The alternative destination may optionally request confirmation from the user before proceeding. The original link destination and original source will be subject to additional checks before the user is permitted to access the source.

Convert Attachments: The autonomous response module converts one or more attachments of this email to a safe format, flattening the file typically by converting into a PDF through initial image conversion. This delivers the content of the attachment to the intended recipient, but with vastly reduced risk. For attachments which are visual in nature, such as images, PDFs and Microsoft Office formats, the attachments will be processed into an image format and subsequently rendered into a PDF (in the case of Microsoft Office formats and PDFs) or into an image of the original file format (if an image). In some email systems, the email attachment may be initially removed and replaced with a notification informing the user that the attachment is undergoing processing. When processing is complete the converted attachment will be inserted back into the email.

Double Lock Links: The autonomous response module replaces the URL with a redirected Email link. If the link is clicked, the user will be presented with a notification to that user that they are not permitted to access the original destination of the link. The user will be unable to follow the link to the original source, but their intent to follow the link will be recorded by the data store via the autonomous response module.

Strip Attachments: The autonomous response module strips one or more attachments of this email. Most file formats are delivered as converted attachments; file formats which do not convert to visible documents (e.g. executables, compressed types) are stripped to reduce risk. The 'Strip attachment' action will cause the system to remove the attachment from the email, and replace it with a file informing the user that the original attachment was removed.

Junk action: The autonomous response module will ensure the email classified as junk or other malicious email is diverted to the recipient's junk folder, or other nominated destination such as 'quarantine'.

Redirect: The autonomous response module will ensure the email is not delivered to the intended recipient but is instead diverted to a specified email address.

Copy: The autonomous response module will ensure the email is delivered to the original recipient, but a copy is sent to another specified email address.

Do not hold or alter: Can be set on a particular user basis. The autonomous response module will ensure the email (s) are never held, and never altered in any way by the system, regardless of actions performed by other models or triggered by the general anomaly threat level.

Take no action on attachments: Can be set on a particular user basis. This action will override any attachment actions that would be otherwise taken by the autonomous response module whether in response to a particular threat alert or overall detected anomaly level.

Header and body action: The autonomous response module will insert specific, custom text into the email Body or Subject Line to add to or substitute existing text, images, or other content in a header and/or body of the email.

Unspoof: The autonomous response module will identify standard email header address fields (e.g. rfc822 type) and replace the Personal Name and the header email address with an alternative name or email address which might reveal more about the true sender of the email. This mechanism significantly reduces the psychological impact of spoof attempts.

FIG. 12 illustrates a block diagram of an embodiment of email module and network module cooperating to supply a particular user's network activity tied to their email activity. FIG. 12 illustrates a block diagram of an embodiment of the email module how the relationship between email addresses may be visually presented on the user interface 150.

Recipients, senders, contact lists for each user may be diagrammed to see how close of a relationship exists; and thus, a factor of how likely or unusual this recipient is to receive an email from this sender; and vice versa.

The network module and its machine learning models as well as the email module and its machine learning models are utilized to determine potentially unusual network activity that provides an additional input of information into the cyber-threat module to determine the threat risk parameter. A particular user's network activity can be tied to their email activity because the network module observes network activity and the cyber-threat module receives the network module observations to draw that into an understanding of this particular user's email activity to make an appraisal of potential email threats with a resulting threat risk parameter tailored for different users in the e-mail system.

Sender Interactions: A first pane of the user interface graphically represents an example of an email interaction observed by the email module for the sender email address. The sender node is the central node, and the recipient for the specific message selected is indicated by a larger connected node.

Recipient Interactions: A second pane of the user interface graphically represents an example of all of the email interactions observed by the email module for the recipient email address. The recipient node is the central node, and the sender for the specific message selected is indicated by a larger connected node.

The email module keeps track of whether a domain is internal or external in relation to the email application's domain that it is monitoring. Therefore, for external recipients/senders, others from their organization or domain will also appear as external.

Defense System

FIG. 13 illustrates an example cyber-threat defense system protecting an example network. The example network FIG. 13 illustrates a network of computer systems 50 using a threat detection system. The system depicted by FIG. 13 is a simplified illustration, which is provided for ease of explanation of the invention. The system 50 comprises a first computer system 10 within a building, which uses the threat detection system to detect and thereby attempts to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 9.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cyber threat defense system for a network including an email domain, comprising a computing device communicatively coupled to a set of computing devices, the computing device comprising:
    a first module configured to utilize a set of machine learning models, communicate with a cyber threat module, and receive information from a set of detectors to provide at least a range of metadata from observed email communications in the email domain, wherein the cyber threat module is configured to cooperate with the first module to (i) analyze the range of metadata from the observed email communications and (ii) analyze the machine learning models trained on a normal behavior of email activity and user activity associated with the network and its email domain to determine when a deviation from the normal behavior of email activity and the user activity associated with the network and its email domain occurs;
    a mass email association detector configured to determine a similarity between two or more emails being i) sent from or ii) received by a collection of two or more individual users in the email domain in a prescribed time frame, wherein one or more mathematical models are used to determine similarity weighing to derive a similarity score between compared emails;
    an email layout change predictor module configured to detect anomaly deviations by considering at least a layout of the email, wherein the email layout change predictor module utilizes one or more machine learning models that are trained to model and store a historical norm state of the layout of the email, including at least a formatting of the email and a structure of an email body;
    an image-tracking link module configured to cooperate with the email layout change predictor module to analyze properties that describe the visual style and appearance of the tracking link to detect whether the tracking link is a suspicious covert tracking link, and wherein an autonomous response module is configured to take an autonomous action to remedy the tracking link when the tracking link is determined to be a suspicious covert tracking link while allowing other emails with a tracking link to enter the email domain; and
    wherein when software instructions are implemented in the first module, the cyber-threat module, and the one or more machine learning models, the software instructions are stored in an executable form in one or more memories and configured to be executed by one or more processors.

2. The cyber threat defense system of claim 1, wherein the mass email association module is further configured to determine a likelihood that the two or more emails being i) sent from or ii) received by a collection of users in the email domain under analysis in the prescribed time period, based on at least i) historical patterns of communication between those users, and ii) the rarity of the collection of users under analysis sending and/or receiving email in the prescribed time period, wherein the mass email association module uses the normal behavior of email activity and user activity associated with the network and its email domain to create a map of associations between users in the email domain to generate the likelihood that the two or more users would be included in the emails determined by the mass email association detector.

3. The cyber threat defense system of claim 1, further comprising:
    one or more mathematical models configured to determine similarity weighing to derive the similarity score between compared emails; and
    an email similarity scoring module configured to cooperate with the one or more mathematical models to compare an incoming email, and deriving, based on a semantic similarity of multiple aspects of the incoming email to a cluster of different metrics derived from known bad emails, the similarity score between an email under analysis and the cluster of different metrics derived from known bad emails.

4. The cyber threat defense system of claim 1, wherein the email layout change predictor module is further configured to analyze changes in the email layout of the email of the user corresponding to the user's email domain to assess whether malicious activity is occurring to an email account of the user based on the changes in the email layout of the email deviating from the historical norm.

5. The cyber threat defense system of claim 4, wherein the email layout change predictor module is further configured to detect the anomaly deviations by considering two or more parameters of the email selected from a group consisting of: the layout of the email, the formatting of the email, the structure of the email body including any of content, language-usage, subjects, and sentence construction within the email body to detect a change in behavior of a sender of the email under analysis indicative of the email account being compromised.

6. The cyber threat defense system of claim 5, wherein the email layout change predictor module is further configured to compare the historical norm state of the layout, the formatting, and the structure every time a new email is seen to check whether the new email diverges more than a threshold amount from the historical norm state.

7. The cyber threat defense system of claim 1, further comprising:
one or more bloom filters configured to provide a method of storing commonality data for any of i) domains, ii) hostnames, and iii) other information regarding observed in email traffic, and using the one or more bloom filters to look up and retrieve the data, and wherein the bloom filters are used to store intelligence known from the network about email traffic, all of which is stored in a compressed manner due to the nesting structure of the bloom filters.

8. The cyber threat defense system of claim 1, wherein the image-tracking link detector is further configured to detect a tracking link based on visual properties of the tracking link as well as a purpose of any query parameters from the tracking link.

9. The cyber threat defense system of claim 8, wherein the image-tracking link module is further configured to cooperate with the image-tracking link detector to analyze properties that describe the visual style and appearance of the tracking link to detect whether the tracking link is being intentionally hidden as well as a type of query requests made by the tracking link, wherein the image-tracking link module is configured to determine whether the tracking link is a suspicious covert tracking link and wherein the autonomous response module is further configured to take an autonomous action to remedy the tracking link when determined to be a suspicious covert tracking link while allowing other emails with a tracking link to enter the email domain.

10. The cyber threat defense system of claim 1, wherein the cyber threat module is configured to receive input from each of the following modules, which include:
the mass email association module further configured to determine a likelihood that two or more emails would be i) sent from or ii) received by a collection of users in the email domain under analysis in the prescribed time period, wherein the prescribed time period is equal to or less than a ten second difference in any of i) a time sent for each of the emails under analysis, and ii) a time received for each of the emails under analysis;
an email similarity scoring module configured to compare an incoming email, and deriving, based on a semantic similarity of multiple aspects of the incoming email to a cluster of different metrics derived from known bad emails, the similarity score between an email under analysis and the cluster of different metrics derived from known bad emails;
the email layout change predictor module further configured to analyze changes in an email layout of an email of a user corresponding to the user's email domain to assess whether malicious activity is occurring to an email account of the user, based on the changes in the email layout of the email deviating from a historical norm;
the image-tracking link module further configured to cooperate with an image-tracking link detector to analyze properties that describe the visual style and appearance of the tracking link to detect whether the tracking link is being intentionally hidden as well as a type of query requests made by the tracking link to determine whether this tracking link is a suspicious covert tracking link; and
wherein the cyber threat module is configured to utilize the input from each of these analyses above in the range of metadata from observed email communications to detect and determine when a deviation from the normal behavior of email activity and user activity associated with the network and its email domain is occurring, and then determine an action to remedy against a potentially malicious email.

11. A method for a cyber threat defense system for a network including its email domain, comprising:
using a first module utilizing a set of machine learning models, communicating with a cyber threat module, and configured to receive information from a set of detectors to provide at least a range of metadata from observed email communications in the email domain;
using the cyber threat module that is configured to (i) cooperate with the first module to analyze the range of metadata from the observed email communications based on operations performed by the machine learning models trained on a normal behavior of email activity and user activity associated with the network and its email domain to determine when a deviation from the normal behavior of email activity and user activity associated with the network and its email domain occurs;
using a mass email association detector to determine a similarity between two or more emails being i) sent from or ii) received by a collection of two or more individual users in the email domain in a prescribed simultaneous time frame, where one or more mathematical models are used to determine similarity weighing to derive a similarity score between compared emails; and
using an email layout change predictor module to detect anomaly deviations by considering at least a layout of the email, wherein the email layout change predictor module utilizes one or more machine learning models trained and configured to model and store a historical norm state of the layout of the email, including at least a formatting of the email and a structure of an email body;
wherein when software instructions are implemented in the first module, the cyber-threat module, and the one or more machine learning models, the software instructions are stored in an executable form in one or more memories and configured to be executed by one or more processors.

12. The method for the cyber threat defense system of claim 11, wherein the mass email association module determines a likelihood that two or more emails that are being i) sent from or ii) received by a collection of users in the email domain under analysis in the prescribed time period, based on at least i) historical patterns of communication between those users, and ii) the rarity of the collection of users under analysis sending and/or receiving email in the prescribed time frame, where the mass email association module uses the normal behavior of email activity and user activity associated with the network and its email domain to create a map of associations between users in the email domain to generate the likelihood that the two or more users would be included in the emails determined by the mass email association detector.

13. The method for the cyber threat defense system of claim 11, further comprising:
using one or more mathematical models to determine similarity weighing in order to derive the similarity score between compared emails; and
using an email similarity scoring module configured to cooperate with the one or more mathematical models to compare an incoming email, and deriving, based on a semantic similarity of multiple aspects of the incoming email to a cluster of different metrics derived from known bad emails, the similarity score between an email under analysis and the cluster of different metrics derived from known bad emails.

14. The method for the cyber threat defense system of claim 11, wherein the email layout change predictor module analyzes changes in the email layout of the email of the user corresponding to the user's email domain to assess whether malicious activity is occurring to an email account of the user based on the changes in the email layout of the email deviating from the historical norm.

15. The method for the cyber threat defense system of claim 14, where the email layout change predictor module is further configured to detect the anomaly deviations by considering two or more parameters of the email selected from group consisting of the layout of the email, the formatting of the email, the structure of the email body including any of content, language-usage, subjects, and sentence construction within the email body to detect a change in behavior of a sender of the email under analysis indicative of the email account being compromised.

16. The method for the cyber threat defense system of claim 15, wherein the email layout change predictor module is further configured to compare the historical norm state of the layout, the formatting, and the structure every time a new email is seen in to check whether the new email diverges more than a threshold amount from the historical norm state.

17. The method for the cyber threat defense system of claim 11, further comprising:
using one or more bloom filters to provide a method of storing commonality data for any of i) domains, ii) hostnames, and iii) other information regarding observed in email traffic, and using the one or more bloom filters to look up and retrieve the data, and wherein the bloom filters are used to store intelligence known from the network about email traffic, all of which is stored in a compressed manner due to the nesting structure of the bloom filters.

18. The method for the cyber threat defense system of claim 11, further comprising using the image-tracking link detector to detect a tracking link based on visual properties of the tracking link as well as a purpose of any query parameters from the tracking link.

19. The method for the cyber threat defense system of claim 18, further comprising:
using an image-tracking link module cooperating with the image-tracking link detector to analyze properties that describe visual style and appearance of the tracking link's to detect whether the tracking link is being intentionally hidden as well as a type of query requests made by the tracking link, wherein the image-tracking link module is configured to determine whether the tracking link is a suspicious covert tracking link, and wherein an autonomous response module is configured to take an autonomous action to remedy the tracking link when the tracking link is determined to be the suspicious covert tracking link while allowing other emails with a tracking link to enter the email domain.

20. The method for the cyber threat defense system of claim 11, wherein the cyber threat module is configured to receive input from each of the following modules, which include:
the mass email association module configured to determine a likelihood that two or more emails would be i) sent from or ii) received by a collection of users in the email domain under analysis in the prescribed time period, wherein the prescribed time period is equal to or less than a ten second difference in any of i) a time sent for each of the emails under analysis, and ii) a time received for each of the emails under analysis;
an email similarity scoring module configured to compare an incoming email, and deriving, based on a semantic similarity of multiple aspects of the incoming email to a cluster of different metrics derived from known bad emails, the similarity score between an email under analysis and the cluster of different metrics derived from known bad emails;
the email layout change predictor module configured to analyze changes in an email layout of an email of a user corresponding to the user's email domain to assess whether malicious activity is occurring to an email account of the user, based on the changes in the email layout of the email deviating from a historical norm;
the image-tracking link module further configured to cooperate with an image-tracking link detector to analyze properties that describe the visual style and appearance of the tracking link to detect whether the tracking link is being intentionally hidden as well as a type of query requests made by the tracking link to determine whether this tracking link is a suspicious covert tracking link; and
wherein the cyber threat module is configured to utilize the input from each of these analyses above in the range of metadata from observed email communications to detect and determine when a deviation from the normal behavior of email activity and user activity associated with the network and its email domain is occurring, and then determine an action to remedy against a potentially malicious email.

21. A non-transitory computer readable medium deployed within a computing device implemented as part of a network, comprising:
a plurality of machine learning models, communicate with a cyber threat module;
a plurality of detectors configured to collect a range of metadata associated with email activity from observed email communications within an email domain associated with the network;
a cyber threat module communicatively coupled to the plurality of machine learning modules, the cyber threat module is configured to assist in conducting analytics of the range of metadata from the observed email communications, utilizing the plurality of machine learning models trained on a normal behavior of email activity and user activity associated with the network and its email domain, to determine when a deviation from the normal behavior of email activity and user activity associated with the network and its email domain occurs;
a mass email association detector module configured to determine a similarity between a plurality of emails from the observed email communications being i) sent from or ii) received by a collection of two or more individual users in the email domain in a prescribed time frame, wherein one or more mathematical models are used to determine similarity weighing to derive a similarity score between the plurality of emails;
an email layout change predictor module configured to detect anomaly deviations by considering at least a layout of an email of the plurality of emails, wherein the email layout change predictor module utilizes one or more machine learning models of the plurality of machine learning models that are trained to model and store a historical norm state of the layout of the email, including at least a formatting of the email and a structure of an email body;

an image-tracking link module configured to cooperate with the email layout change predictor module to analyze properties that describe a visual style and appearance of a tracking link to detect whether the tracking link is a suspicious covert tracking link, and wherein an autonomous response module is configured to take an autonomous action to remedy the tracking link when the tracking link is determined to be the suspicious covert tracking link while allowing other emails with a tracking link to enter the email domain.

22. The non-transitory computer readable medium of claim 21, wherein the mass email association module is further configured to determine a likelihood that two or more emails that are being i) sent from or ii) received by a collection of users in the email domain under analysis in the prescribed time period, based on at least i) historical patterns of communication between those users, and ii) the rarity of the collection of users under analysis sending and/or receiving email in the prescribed time period, wherein the mass email association module uses the normal behavior of email activity and user activity associated with the network and its email domain to create a map of associations between users in the email domain to generate the likelihood that the two or more users would be included in the emails determined by the mass email association detector.

23. The non-transitory computer readable medium of claim 21, further comprising:
one or more mathematical models configured to determine similarity weighing to derive the similarity score between compared emails; and
an email similarity scoring module configured to cooperate with the one or more mathematical models to compare an incoming email, and deriving, based on a semantic similarity of multiple aspects of the incoming email to a cluster of different metrics derived from known bad emails, the similarity score between an email under analysis and the cluster of different metrics derived from known bad emails.

24. The non-transitory computer readable medium of claim 21, wherein the email layout change predictor module is further configured to analyze changes in the email layout of the email of the user corresponding to the user's email domain to assess whether malicious activity is occurring to an email account of the user based on the changes in the email layout of the email deviating from the historical norm.

25. The non-transitory computer readable medium of claim 24, wherein the email layout change predictor module is further configured to detect the anomaly deviations by considering two or more parameters of the email selected from a group consisting of: the layout of the email, the formatting of the email, the structure of the email body including any of content, language-usage, subjects, and sentence construction within the email body to detect a change in behavior of a sender of the email under analysis indicative of the email account being compromised.

26. The non-transitory computer readable medium of claim 25, wherein the email layout change predictor module is further configured to compare the historical norm state of the layout, the formatting, and the structure every time a new email is seen to check whether the new email diverges more than a threshold amount from the historical norm state.

27. The non-transitory computer readable medium of claim 21, further comprising:
one or more bloom filters configured to provide a method of storing commonality data for any of i) domains, ii) hostnames, and iii) other information regarding observed in email traffic, and using the one or more bloom filters to look up and retrieve the data, and wherein the bloom filters are used to store intelligence known from the network about email traffic, all of which is stored in a compressed manner due to the nesting structure of the bloom filters.

28. The cyber threat defense system of claim 21, wherein the image-tracking link detector is further configured to detect a tracking link based on visual properties of the tracking link as well as a purpose of any query parameters from the tracking link.

29. The non-transitory computer readable medium of claim 28, wherein the image-tracking link module is further configured to cooperate with the image-tracking link detector to analyze properties that describe the visual style and appearance of the tracking link to detect whether the tracking link is being intentionally hidden as well as a type of query requests made by the tracking link, wherein the image-tracking link module is configured to determine whether the tracking link is a suspicious covert tracking link and wherein the autonomous response module is further configured to take an autonomous action to remedy the tracking link when determined to be a suspicious covert tracking link while allowing other emails with a tracking link to enter the email domain.

30. The non-transitory computer readable medium of claim 21, wherein the cyber threat module is configured to receive input from each of the following modules, which include:
the mass email association module further configured to determine a likelihood that two or more emails would be i) sent from or ii) received by a collection of users in the email domain under analysis in the prescribed time period, wherein the simultaneous time period is equal to or less than a ten second difference in any of i) a time sent for each of the emails under analysis, and ii) a time received for each of the emails under analysis;
an email similarity scoring module configured to compare an incoming email, and deriving, based on a semantic similarity of multiple aspects of the incoming email to a cluster of different metrics derived from known bad emails, the similarity score between an email under analysis and the cluster of different metrics derived from known bad emails;
the email layout change predictor module further configured to analyze changes in an email layout of an email of a user corresponding to the user's email domain to assess whether malicious activity is occurring to an email account of the user, based on the changes in the email layout of the email deviating from a historical norm;
the image-tracking link module further configured to cooperate with an image-tracking link detector to analyze properties that describe the visual style and appearance of the tracking link to detect whether the tracking link is being intentionally hidden as well as a type of query requests made by the tracking link to determine whether this tracking link is a suspicious covert tracking link; and
wherein the cyber threat module is configured to utilize the input from each of these analyses above in the range of metadata from observed email communications to detect and determine when a deviation from the normal behavior of email activity and user activity associated with the network and its email domain is occurring, and then determine an action to remedy against a potentially malicious email.

\* \* \* \* \*